US008428574B2

(12) United States Patent
Behairy et al.

(10) Patent No.: US 8,428,574 B2
(45) Date of Patent: Apr. 23, 2013

(54) CONTROLLED MOBILE COMMUNICATION AS A SERVICE

(75) Inventors: Hatim M Behairy, Riyadh (SA); Sami M Al-Humaidi, Riyadh (SA); Waleed S Alrobian, Riyadh (SA); Adnan Al Ghammas, Riyadh (SA); Ibrahem Al Mansour, Riyadh (SA); Abdullah S Dabail, Riyadh (SA); Mishal Al Khalifa, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/104,072

(22) Filed: May 10, 2011

(65) Prior Publication Data

US 2012/0244834 A1  Sep. 27, 2012

Related U.S. Application Data

(63) Continuation of application No. 13/053,270, filed on Mar. 22, 2011, and a continuation of application No. 13/053,288, filed on Mar. 22, 2011.

(51) Int. Cl.
*H04W 4/00* (2009.01)
(52) U.S. Cl.
USPC ............... 455/422.1; 455/414.1; 455/414.2; 455/418; 455/419; 455/432.1; 455/456.1; 455/456.3; 455/561; 455/562.1
(58) Field of Classification Search ............. 455/414.1, 455/414.2, 417, 419, 420, 432.1, 456.1, 456.3, 455/455/456.4, 463, 560, 565, 518, 519, 455/431.2, 432.3, 422.1
See application file for complete search history.

(56) References Cited

U.S. PATENT DOCUMENTS

| | | | | |
|---|---|---|---|---|
| 5,940,756 | A * | 8/1999 | Sibecas et al. | 455/426.1 |
| 6,038,445 | A * | 3/2000 | Alperovich et al. | 455/432.1 |
| 6,230,017 | B1 * | 5/2001 | Andersson et al. | 455/456.6 |
| 6,564,066 | B1 * | 5/2003 | Biggs et al. | 455/512 |
| 7,010,305 | B2 * | 3/2006 | Immonen et al. | 455/452.2 |
| 7,161,914 | B2 * | 1/2007 | Shoaib et al. | 370/331 |
| 7,394,786 | B2 * | 7/2008 | Virtanen | 370/329 |
| 7,606,914 | B2 * | 10/2009 | Ikeda et al. | 709/228 |
| 7,643,411 | B2 * | 1/2010 | Andreasen et al. | 370/229 |
| 7,916,691 | B2 * | 3/2011 | Kopplin | 370/329 |
| 8,009,675 | B2 * | 8/2011 | Andersson | 370/395.21 |
| 8,040,864 | B2 * | 10/2011 | Karaoguz et al. | 370/338 |
| 2005/0181773 | A1 * | 8/2005 | Chang | 455/414.1 |
| 2007/0002868 | A1 * | 1/2007 | Qian et al. | 370/395.21 |
| 2008/0207217 | A1 * | 8/2008 | Ramanathan et al. | 455/456.1 |
| 2010/0124931 | A1 * | 5/2010 | Eskicioglu et al. | 455/440 |

* cited by examiner

*Primary Examiner* — Olumide T Ajibade Akonai
(74) *Attorney, Agent, or Firm* — Raj Abhyanker, P.C.

(57) ABSTRACT

A method of providing controlled mobile communication as a service includes storing, in a memory associated with a data processing device and/or a base station controller, a level of control of wireless communication associated with a mobile device of a customer of the controlled mobile communication as a service. The wireless communication is provided through a mobile network operator. The method also includes identifying, through the base station controller, the mobile device based on an identification data associated therewith when the mobile device is within a controlled area associated with the controlled mobile communication service, and controlling the wireless communication associated with the mobile device of the customer through the base station controller in accordance with the level of control stored in the memory following the identification of the mobile device.

33 Claims, 16 Drawing Sheets

| MOBILE DEVICE 502 | IDENTITY 504 | LOCATION 506 | ACCESS 508 |
|---|---|---|---|
| MOBILE DEVICE 112$_1$ | 310150123456789 | COVERAGE AREA | RESTRICTED |
| MOBILE DEVICE 112$_2$ | 310150223456789 | OUTSIDE COVERAGE AREA | NOT IN COVERAGE AREA |
| MOBILE DEVICE 112$_3$ | UNKNOWN | UNKNOWN | NOT IN COVERAGE AREA |
| MOBILE DEVICE 112$_4$ | 310150423456789 | COVERAGE AREA | GRANTED |
| ... | ... | ... | ... |

DATABASE 500

FIGURE 5

| MOBILE DEVICE 602 | IDENTITY 604 | LOCATION 606 | VEHICLE 608 | ACCESS 610 |
|---|---|---|---|---|
| MOBILE DEVICE 220 | 82569 | CONTROLLED AREA 138 | VEHICLE 134 | GRANTED |
| MOBILE DEVICE 222 | 82754 | OUTSIDE CONTROLLED AREA | UNKNOWN | NOT GRANTED |
| MOBILE DEVICE 224 | UNKNOWN | CONTROLLED AREA 138 | UNKNOWN | NOT GRANTED |
| MOBILE DEVICE 226 | 81765 | CONTROLLED AREA 138 | CONVOY 136 | GRANTED |
| ... | ... | ... | ... | ... |

DATABASE 600

CONTROLLED MOBILE COMMUNICATION AS A SERVICE

CLAIM OF PRIORITY

This is a Utility application and claims priority to the following:

U.S. utility application Ser. No. 13/053,270 titled CONTROLLED MOBILE COMMUNICATION IN A SOCIALLY SENSITIVE ENVIRONMENT filed on Mar. 22, 2011.

U.S. utility application Ser. No. 13/053,288 titled SELECTIVE CONTROL OF A WIRELESS SERVICE ASSOCIATED WITH A MOBILE DEVICE filed on Mar. 22, 2011.

FIELD OF TECHNOLOGY

This disclosure relates generally to mobile communication systems and more particularly, to a method, an apparatus and/or a system of controlled mobile communication as a service.

BACKGROUND

A use of a mobile phone may be restricted to a coverage area determined by a mobile network operator (MNO). However, a user of the mobile phone may have no control over how to limit, monitor and/or restrict a cellular signal within the coverage area. The aforementioned lack of control may inconvenience the user of the mobile phone and/or societal members during events within the coverage area that may require silence such as religious functions and movies. The user may wish not to be interrupted and distracted by, for example, a telephone call or a Short Message Service (SMS) message during the events.

A mobile device jammer may be employed to restrict access to a mobile device (e.g., the mobile phone discussed above) through preventing the mobile device from receiving a cellular signal from a cell tower and/or transmitting the cellular signal to the cell tower. However, the use of the mobile device jammer may be illegal in certain jurisdictions. Moreover, signals generated by the mobile device jammer to restrict access to a mobile device may disrupt the functionality of other sensitive electronic equipment (e.g., a pacemaker). As a result, the use of the mobile device jammer may be harmful to individuals, and may not be feasible in certain geographic locations.

SUMMARY

Disclosed are a method, a system and/or an apparatus of controlled mobile communication as a service.

In one aspect, a method of providing controlled mobile communication as a service includes storing, in a memory associated with a data processing device and/or a base station controller, a level of control of wireless communication associated with a mobile device of a customer of the controlled mobile communication as a service. The wireless communication is provided through a mobile network operator. The method also includes identifying, through the base station controller, the mobile device based on an identification data associated therewith when the mobile device is within a controlled area associated with the controlled mobile communication service, and controlling the wireless communication associated with the mobile device of the customer through the base station controller in accordance with the level of control stored in the memory following the identification of the mobile device.

In another aspect, a method of transacting a service involving control of wireless communication associated with a mobile device of a customer thereof includes storing, in a memory associated a data processing device and/or a base station controller, a level of control of wireless communication associated with the mobile device of the customer, an controlling at least a portion of the wireless communication associated with the mobile device in accordance with the stored level of control. The method also includes generating, through the data processing device, an invoice associated with the service to the customer on a basis of data associated with the stored level of control and data associated with a provided level of control of wireless communication associated with the mobile device.

In yet another aspect, a mobile communication system providing controlled wireless communication as a service includes a mobile device associated with a customer of the controlled wireless communication as a service and a data processing device configured to store a level of control of wireless communication associated with the mobile device in a memory associated therewith. The mobile communication system also includes a base station controller to identify the mobile device based on an identification data associated therewith when the mobile device is within a controlled area associated with the controlled mobile communication service and to control at least a portion of the wireless communication associated with the mobile device in accordance with the level of control stored in the memory associated with the data processing device following the identification.

The data processing device is configured to generate an invoice associated with the service to the customer on a basis of data associated with the stored level of control and data associated with a provided level of control of wireless communication associated with the mobile device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not a limitation in the figures of accompanying drawings, in which like references indicate similar elements and in which:

FIG. 5 is a schematic view of a database of information associated with mobile device(s) stored at a server in the mobile communication system of FIG. 1, according to one or more embodiments.

Other features of the present embodiments will be apparent from accompanying Drawings and from the Detailed Description that follows.

DETAILED DESCRIPTION

Disclosed are a method, an apparatus and/or a system of controlled mobile communication as a service. Although the present embodiments have been described with reference to specific example embodiments, it will be evident that various modifications and changes may be made to these embodiments without departing from the broader spirit and scope of the various embodiments.

Figure 1:
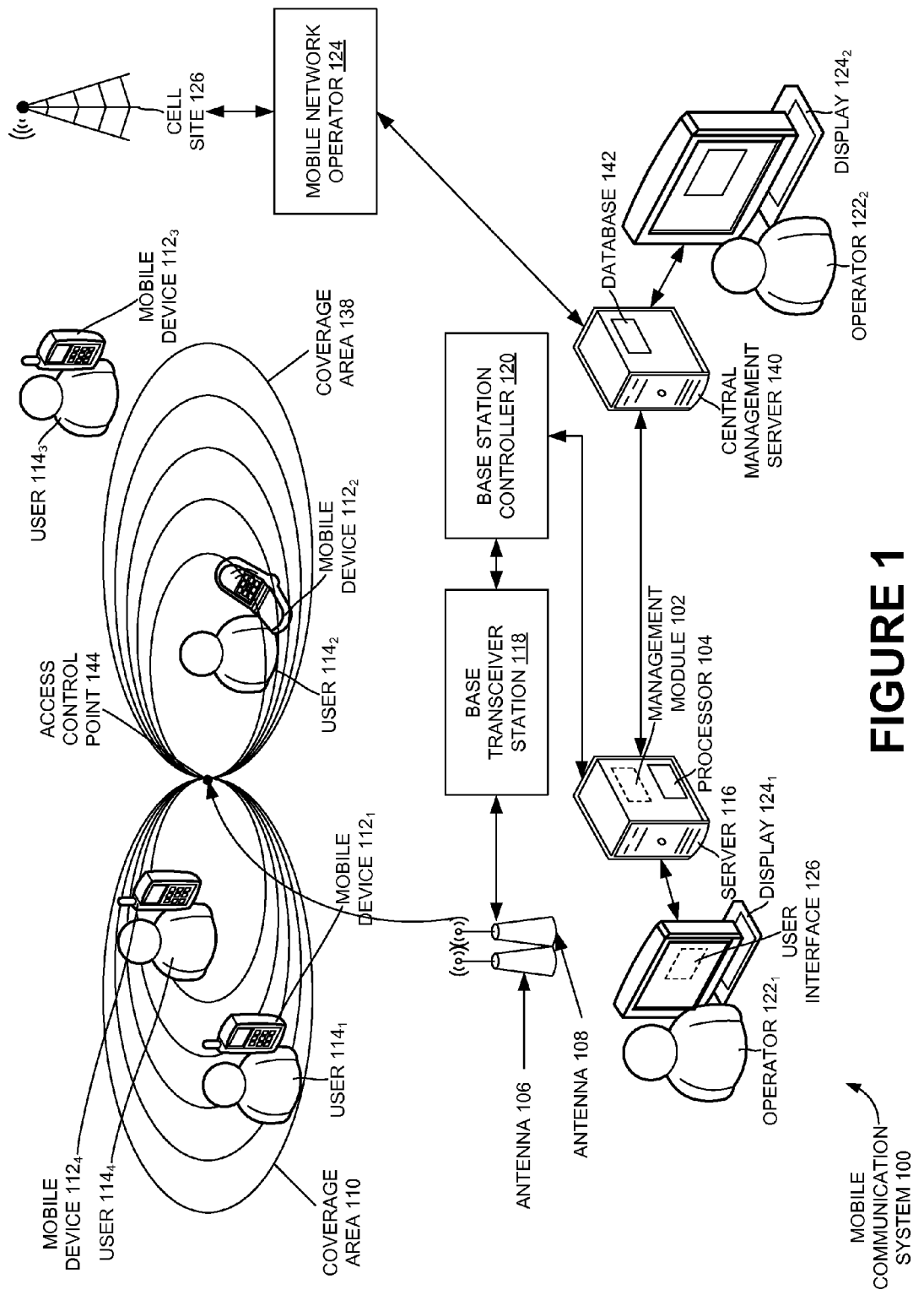
FIG. 1 is a schematic view of a mobile communication system, according to one or more embodiments.

FIG. 1 shows a mobile communication system 100 configured to enable control of access of wireless service(s) to mobile device(s), according to one or more embodiments. In one or more embodiments, mobile communication system 100 may include the requisite control equipment for communication associated therewith. In one or more embodiments, the control equipment may include a Base Station Controller (BSC) 120 coupled to one or more Base Transceiver Stations (BTSs) (e.g., BTS 118) to facilitate wireless communication between a mobile device (e.g., mobile device $112_1$) and the mobile network associated therewith. In one or more embodiments, the one or more BTSs may be wireless communications station(s) installed at fixed location(s) and used to communicate as part of a wireless telephone system such as cellular Code Division Multiple Access (CDMA) and/or Global System for Mobile Communications (GSM™) cell site. A wireless telephone base station may communicate with a mobile or hand-held phone.

In one or more embodiments, the "intelligence" associated with BTS 118 may be provided through BSC 120. In one or more embodiments, BSC 120 may handle allocation of radio channel(s) to mobile device $112_1$ and/or receive measurements therefrom. In an example embodiment, a management module 102 associated with BSC 120 may execute on a server 116 associated therewith. In one or more embodiments, server 116 may be an application server, e-mail server, communications server, web server, file server, central management server, etc. In one or more embodiments, server 116 may communicate with a mobile network operator (MNO) 124 based on a set of instructions configured to execute on a processor 104 thereon. In one example embodiment, the one or more BTSs (e.g., BTS 118) may wirelessly communicate with a remote server. In another example embodiment, server 116 may be the same as BSC 120 or processor 104 may be associated with BSC 120. In one or more embodiments, server 116 may include a memory (not shown) associated therewith.

In one example embodiment, the one or more BTSs may be coupled to the BSC 120 through a local area network (LAN). In one or more embodiments, each BTS may include one or more antennas associated therewith (e.g., antenna 106, antenna 108) having coverage area(s) (e.g., coverage area 110, coverage area 138) associated therewith. As shown in FIG. 1, coverage area 110 may be associated with antenna 106 and coverage area 138 may be associated with antenna 108. In one or more embodiments, the aforementioned coverage areas (e.g., coverage area 110, coverage area 138) may be area(s) where the power transmitted from the corresponding antenna(s) is above a threshold value. As will be implied below, in one or more embodiments, the threshold value may be based on a wireless signal from MNO 124. In one or more embodiments, BTS 118 may be a femtocell or a picocell.

In one or more embodiments, BSC 120 may determine an identity of mobile device $112_1$ when mobile device $112_1$ is within coverage area 110 and coverage area 138. In one or more embodiments, the location of mobile device $112_1$ may be traced to coverage area 110 and coverage area 138 based on a detection thereof through antenna 106 and antenna 108 respectively. In one or more embodiments, a point of entry into coverage area 110 from coverage area 138 and vice versa may be termed as an access control point 144. In one or more embodiments, coverage area 110 and coverage area 138 may be controlled through BSC 120. For example, coverage area 110 may be associated with a place of worship (e.g., church, mosque, temple), a meeting room or a movie theater, and access control point 144 may be a door, a turnstile, a parking gate, an elevator or any other location associated with coverage area 110 where wireless access is monitored.

In one or more embodiments, BSC 120 may permit control of an access of a wireless signal of mobile device $112_1$ when mobile device $112_1$ is traced to be within coverage area 110. In one or more embodiments, the aforementioned control permission may be based on the identity (e.g., based on the International Mobile Subscriber Identity (IMSI) number, based on the International Mobile Station Equipment Identity (IMEI) number) of mobile device $112_1$. In one or more embodiments, as discussed above, mobile device $112_1$ may be traced to be within coverage area 110 based on the detection thereof by antenna 106. However, when user $114_1$ is outside coverage area 110, antenna 106 may not be able to detect mobile device $112_1$. Instead, in one or more embodiments, antenna 108 may detect mobile device 112$_1$ within coverage area 138 associated therewith, which is substantially contiguous with coverage area 110, as shown in FIG. 1.

In one or more embodiments, when user 114$_1$ is on the fringe(s) (or, periphery) of coverage area 110 without passing through access control point 144, mobile service(s) thereto may be undesirably controlled. In one or more embodiments, the presence of antenna 108 may ensure that a user on the fringe(s) of coverage area 110 may also be detected therethrough (as, for example, the user is also on the fringe(s) of coverage area 138). Therefore, in one or more embodiments, wireless service(s) to user 114$_1$ may not be undesirably controlled. To summarize, in one or more embodiments, the location of user 114$_1$ (or, mobile device 112$_1$) may be exactly traced within coverage area 110 or coverage area 138 (and, coverage area 110 and coverage area 138 when user 114$_1$ is on the fringe(s) of the coverage areas), based on a sequence of detection of mobile device 112$_1$ through antenna 106 and antenna 108.

In one or more embodiments, an arrival of user 114$_1$ through access control point 144 may be detected in a sequence, i.e., firstly through antenna 108 and then through antenna 106. Similarly, in one or more embodiments, when user 114$_1$ passes through access control point 144 from coverage area 110 into coverage area 138, the detecting element changes from antenna 106 to antenna 108. It is obvious that more than one antenna may be associated with coverage area 110 and/or coverage area 138.

FIG. 1 shows a cell site (e.g., cell site 126) configured to provide wireless service(s) to mobile device 112$_1$ when mobile device 112$_1$ is not inside coverage area 110. For example, cell site 126 may include one or more antenna(s) and electronic communications equipment placed on a radio mast or tower configured to control a cell in mobile communication system 100. Cell site 126 may be coupled to MNO 124. MNO 124 may provide services for mobile phone subscribers associated with mobile communication system 100.

In the example embodiment shown in FIG. 1, when a user 114$_1$ of mobile device 112$_1$ enters coverage area 110 through access control point 144, the signal generated through antenna 106 may be stronger than the signal associated with cell site 126. In one or more embodiments, the aforementioned generation of the stronger signal may be controlled through BSC 120. Due to the generation of the stronger signal through antenna 106, mobile device 112$_1$ may be prevented from receiving the signal from cell site 126 (or, the signal associated with the usual wireless service thereto) and from transmitting a signal thereto through BSC 120. Thus, in one or more embodiments, control of wireless service(s) to mobile device 112$_1$ may be switched between BSC 120 and MNO 124 following the entry thereof into coverage area 110 through access control point 144. When user 114$_1$ of mobile device 112$_1$ leaves coverage area 110 to an outside area thereof (e.g., coverage area 138, outside coverage area 110 and coverage area 138), normal wireless service(s) (e.g., wireless service(s) through MNO 124/cell site 126) may be resumed. However, as seen above, in one or more embodiments, mobile device 112$_1$ may be monitored through BSC 120 even when in coverage area 138.

FIG. 1 shows mobile device 112$_2$ associated with user 114$_2$, mobile device 112$_3$ associated with user 114$_3$ and mobile device 112$_4$ associated with user 114$_4$, in addition to mobile device 112$_1$. While mobile device 112$_1$ and mobile device 112$_4$ may both be located inside coverage area 110, wireless service(s) associated with mobile device 112$_1$ may solely be restricted, as will be discussed below. Mobile device 112$_2$ and mobile device 112$_3$ may both be located outside coverage area 110. Mobile device 112$_2$ may be within coverage area 138 and, therefore, may be detected through antenna 108. However, the wireless service(s) thereto through MNO 124 may not be managed/controlled. Mobile device 112$_3$ may be completely outside both coverage area 110 and coverage area 138. Therefore, mobile device 112$_3$ may not even be detected through antenna 106 and antenna 108.

The aforementioned locations of the mobile devices (e.g., mobile device 112$_1$, mobile device 112$_2$, mobile device 112$_3$, mobile device 112$_4$) represent scenarios associated therewith. Depending on whether the mobile device(s) are within coverage area 110 and/or are known/unknown (e.g., part of a whitelist or not), control of wireless service(s) associated therewith may vary.

In one or more embodiments, BSC 120 may permit control/management of mobile device 112$_1$ based on a blacklist and/or a whitelist maintained at server 116. In one or more embodiments, the whitelist may be a list and/or a register of entries associated with the mobile devices that includes information associated with particular privilege(s), service(s), mobility, access and/or recognition(s) assigned thereto. In one or more embodiments, the blacklist may be a list and/or a register of entries associated with the mobile devices that includes information associated with particular privilege(s), services(s), mobility, access and/or recognition(s) denied thereto.

In one or more embodiments, the whitelist/blacklist may be maintained at server 116 configured to execute management module 102 thereon. In one or more embodiments, the whitelist/blacklist may be hardcoded into a virtual BTS (vBTS) associated with BSC 120. In one or more embodiments, an operator 122$_1$ may initialize and maintain control (s) associated with mobile communication system 100 and may monitor an activity and an availability thereof. In one or more embodiments, operator 122$_1$ may interact with server 116 through a user interface 126 on a display 124$_1$ associated with server 116. In one or more embodiments, profile data and/or the whitelist/blacklist associated with the mobile device(s) may be stored in server 116. In one or more embodiments, the profile data and/or the whitelist/blacklist may be shared (or, transmitted to) with a central management server 140. In one or more embodiments, central management server 140 may be associated with MNO 124. In other words, in one or more embodiments, central management server 140 may serve as an MNO interface.

In one or more embodiments, an operator 122$_2$ may access and/or manage the profile data and/or the whitelist/blacklist stored in central management server 140. In one or more embodiments, operation 122$_2$ may be a technical user having access to central management server 140 and the capability to monitor an activity and an availability thereof. In one or more embodiments, the profile data and/or the whitelist/blacklist may be in the form of a database 142 stored at central management server 140. In one or more embodiments, database 142 may be accessed by operator 122$_2$ through a display 124$_2$ associated with central management server 140. As shown in FIG. 1, management module 102 executing on server 116 may be interfaced (e.g., through a link) with central management server 140.

It is obvious that central management server 140, server 116 and/or BSC 120 may also be the same physical machine. Modifications in the location(s) of the servers and/or BSC 120 are also within the scope of the exemplary embodiments.

In an example scenario, coverage area 110 may include a classroom. Access control point 144 may be associated with, for example, the entrance door to the classroom. The aforementioned door may be a point of entry into coverage area 110 associated with antenna 106. The user(s) of mobile device(s) may include teachers and/or students associated with the classroom. When a user passes access control point 144 to enter coverage area 110, antenna 106 may detect the mobile device(s) based on identification data associated therewith after the detection through antenna 108 (again, based on the identification data). The identification data and/or the whitelist/blacklist maintained at server 116 and/or central management server 140 may be associated with students and/or teachers (or, staff) of an educational institution associated with the classroom. Specific wireless service(s) to mobile device(s) may be permitted or denied based on whether the user(s) thereof are in the whitelist/blacklist. In an example embodiment, the blacklist may include students (and/or outsiders), for whom all mobile services may be disabled and the whitelist may include teachers for whom some, if not all, mobile services may be enabled.

In another example scenario, coverage area 110 may include a hospital. In one or more embodiments, the whitelist maintained at server 116 and/or central management server 140 may include all identification data associated with the doctors and the staff of the hospital, while the blacklist may include the identification data of the patients in the hospital and/or visitors associated with the patients. Thus, specific wireless service(s) to mobile device $112_1$ may be permitted or denied based on whether the user (e.g., user $114_1$) thereof is associated with the corresponding whitelist or the blacklist. In an example embodiment, the blacklist may include outsiders, for whom all mobile services may be disabled and the patients/visitors, for whom some, if not all, mobile services may be disabled. The doctors and/or the staff may have all mobile services enabled.

In an example embodiment, permission associated with delivery of an advertising message may be granted to mobile device $112_1$ through BSC 120 when mobile device $112_1$ is within coverage area 110. For example, delivery of the advertising message may be based on the location of mobile device $112_1$ and/or demographic data associated with user $114_1$ of mobile device $112_1$. The demographic data, for example may be stored in server 116. The advertising message may be a Short Message Service (SMS) message or a Multimedia Message Service (MMS) message. In one or more embodiments, the demographic data of user $114_1$ of mobile device $112_1$ may be stored in correspondence with the identity of mobile device $112_1$.

In one or more embodiments, as discussed above, BSC 120 may detect movement of mobile device $112_1$ (through movement of user $114_1$) into coverage area 110. In one or more embodiments, a number of antennas may be utilized in a triangulation scheme to detect the exact location(s) of mobile device(s) within/outside/at the boundaries of coverage area 110. It is obvious that the detection scheme mentioned above and/or the number of antennas may be varied and that such variations are within the scope of the exemplary embodiments.

Figure 2:
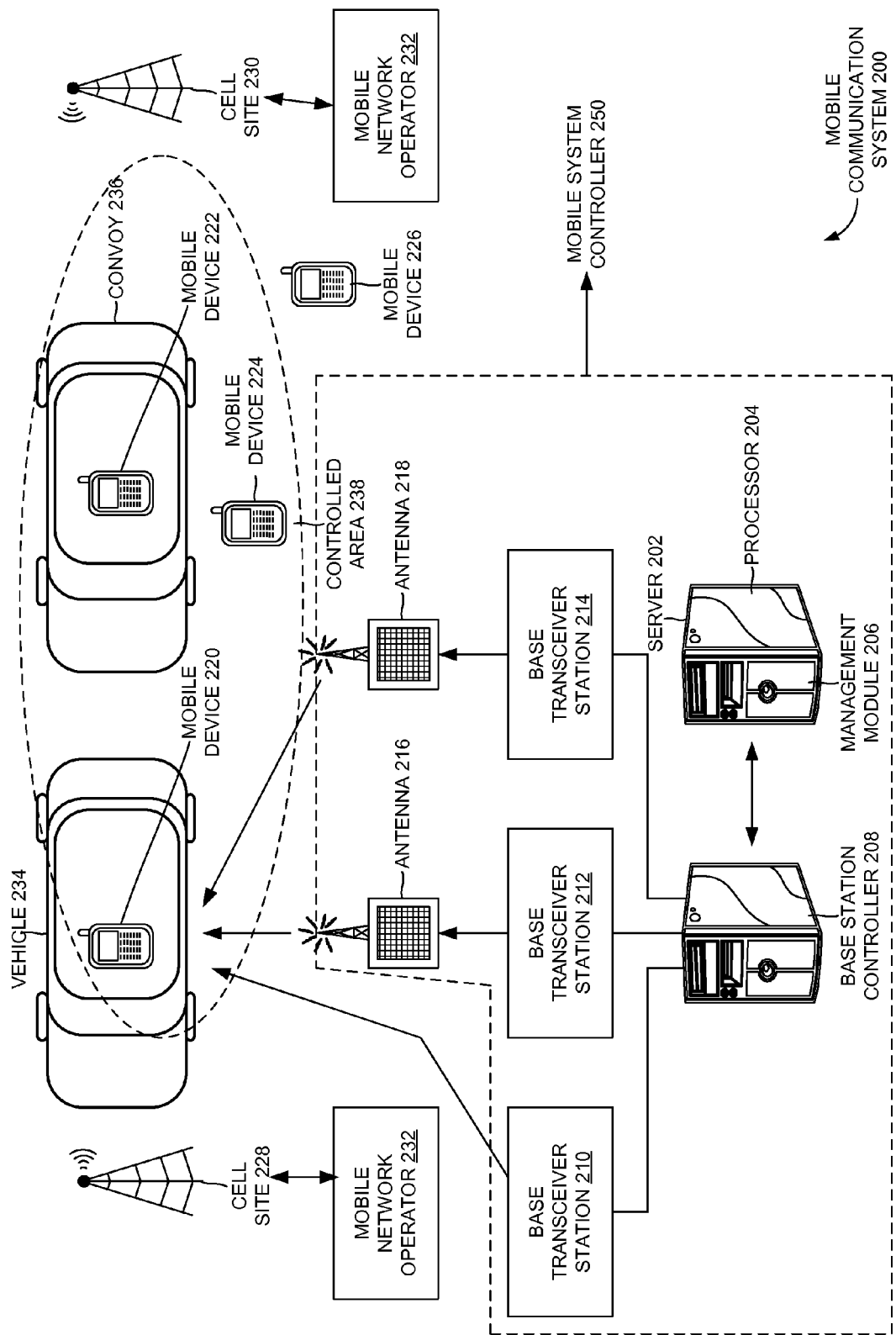
FIG. 2 is a schematic view of a vehicular mobile communication system, according to one or more embodiments.

FIG. 2 shows another mobile communication system 200, according to one or more embodiments. In one or more embodiments, a mobile system controller 250 of mobile communication system 200 may include the requisite control equipment for communication associated therewith. Analogous to mobile communication system 100, in one or more embodiments, mobile system controller 200 may include one or more BTSs (e.g., BTS 210, BTS 212, BTS 214) to facilitate wireless communication between a mobile device (e.g., mobile device 220) and the mobile network associated therewith. In one or more embodiments, the one or more BTSs may be wireless communication station(s) installed at fixed location(s) (e.g., here within vehicle 234, as will be discussed below) and used to communicate as part of a wireless telephone system such as cellular CDMA and/or GSM™ cell site.

Again, in one or more embodiments, the "intelligence" associated with BTS 210, BTS 212 and BTS 214 may be provided through a BSC 208. In one or more embodiments, BSC 208 may handle allocation of radio channel(s) to mobile device 220 and/or receive measurements therefrom. In an example embodiment, a management module 206 of mobile system controller 250 may execute on a server 202 associated with BSC 208. In one or more embodiments, server 202 may be an application server, e-mail server, communications server, web server, file server, central management server, etc. In one or more embodiments, server 202 may communicate with a mobile network operator 232 based on a set of instructions configured to execute on a processor 204 thereon. In one example embodiment, the one or more BTSs (e.g., BTS 210, BTS 212, BTS 214) may wirelessly communicate with a remote server. In another example embodiment, server 202 may be the same as BSC 208 or processor 204 may be associated with BSC 208. In one or more embodiments, server 202 may include a memory (not shown) associated therewith.

In one example embodiment, the one or more BTSs may be coupled to BSC 208 through a LAN or a TCP connection. In one or more embodiments, each BTS may include one or more antennas associated therewith (e.g., antenna 216, antenna 218) having a coverage area associated therewith. In one or more embodiments, one antenna (e.g., antenna 216) may have a coverage area different from another antenna (e.g., antenna 218). The base station may be a femtocell or a picocell. In one or more embodiments, one or more of the BTSs (e.g., BTS 210) may be set up as a dedicated "network listener." For example, BTS 210 may select an appropriate Absolute Radio-Frequency Channel Number (ARFCN) to be utilized by mobile device 220.

In one or more embodiments, a user of mobile device 220 may be driving a vehicle 234. In one or more embodiments, as vehicle 234 is moving, the aforementioned one or more BTSs (e.g., BTS 210, BTS 212, BTS 214) may be placed inside vehicle 234. As shown in FIG. 2, in one or more embodiments, another moving vehicle (e.g., convoy 236) may serve to monitor vehicle 234. For example, vehicle 234 may include a Very Important Person (VIP), and convoy 236 may include a security guard thereof.

FIG. 2 shows controlled area 238, which may be the combined coverage area of antenna 216 and antenna 218. In one or more embodiments, BSC 208 (or, server 202) may determine an identity of mobile device 220 when mobile device 220 is within controlled area 238. In one or more embodiments, the location of mobile device 220 may be traced to controlled area 238 based on the detection thereof utilizing the one or more antennas. In one or more embodiments, the coverage area (not shown) of an antenna (not shown) associated with "network listener" BTS 210 may be greater than controlled area 238. In one or more embodiments, "network listener" BTS 210 may serve to monitor the BTS environment of an MNO associated with providing wireless service(s) to mobile devices within the coverage area thereof. It is obvious that the coverage area of the antenna associated with "network listener" BTS 210 and controlled area 238 may be varying due to the movement of vehicle 234.

FIG. 2 shows a single "network listener" BTS 210. However, in one or more embodiments, there may be a pair of "network listener" BTSs (and one or more antennas associated therewith) to scan and analyze the MNO BTS environment. The pair of "network listener" BTSs is, again, controlled by BSC 208. In one or more embodiments, the "channel" selection operation through BSC 208 may be enabled through information received by the pair of "network listener" BTSs. In one or more embodiments, "network listener" BTS 210 may also be configured to enable the increase of signal levels of antenna 216 and/or antenna 218 associated with BTS 212 and BTS 214 respectively when mobile device 220 is within controlled area 238 such that BSC 208 may gain control of access to wireless service(s) (e.g., from MNO 232) associated with mobile device 220.

In one or more embodiments, thus, BSC 208 may permit control of an access of a wireless signal of mobile device 220 when mobile device 220 is traced to be within controlled area 238. In one or more embodiments, the aforementioned control permission may be based on the identity (e.g., based on the IMSI number, based on the IMEI number) of mobile device 220.

FIG. 2 shows a cell site (e.g., cell site 228, cell site 230) configured to provide wireless service(s) to mobile device 220 when mobile device 220 is not inside controlled area 238. For example, again, a cell site may include one or more antenna(s) and electronic communications equipment placed on a radio mast or tower configured to control a cell in mobile communication system 200. Cell site 228 and/or cell site 230 may be coupled to MNO 232. As discussed above, MNO 232 may provide services for mobile phone subscribers associated with mobile communication system 200. In one or more embodiments, as vehicle 234 is moving, the signal associated with cell site 228 or cell site 230 may be stronger, depending on the location of vehicle 234.

In the example embodiment shown in FIG. 2, when a user of mobile device 220 is driving vehicle 234 and has entered controlled area 238, the signal generated through antenna 216 and/or antenna 218 may be stronger than the signal associated with MNO 232 (e.g., cell site 228, cell site 230). Therefore, mobile device 220 may be prevented from receiving the signal associated with MNO 232 (e.g., from cell site 228, cell site 230) and from transmitting a signal thereto through BSC 208.

In one or more embodiments, the location of mobile device 220 may be determined to be within controlled area 238 based on a detection of mobile device 220 through the one or more antenna(s). In one or more embodiments, upon detection of the location, mobile device 220 may be rendered controllable through BSC 208.

FIG. 2 shows mobile device 222, mobile device 224 and mobile device 226, in addition to mobile device 220. While mobile device 220 may be located in moving vehicle 234, mobile device 222 may be in convoy 236, mobile device 224 may be within controlled area 238 but is stationary and mobile device 226 may be stationary and outside controlled area 238. The aforementioned locations of the mobile devices represent scenarios in which the mobile devices may be controlled. It is obvious that mobile device 224, which is shown as being within controlled area 238 in FIG. 2, may be out of controlled area 238 with the subsequent movement of vehicle 234. Also, it is obvious that mobile device 226, which is shown as being outside controlled area 238 in FIG. 1, may be within controlled area 238 with the subsequent movement of vehicle 234.

In one or more embodiments, BSC 208 may permit control/management of mobile device 220 inside the moving vehicle 234 based on a whitelist, maintained at server 202. In one or more embodiments, the whitelist may be a list and/or a register of entries associated with the mobile device(s) that includes information associated with particular privilege(s), service(s), mobility, access and/or recognition(s) assigned thereto. In one example embodiment, alternately, the whitelist may be hardcoded into a virtual BTS (vBTS) executing on a single BTS platform associated with BSC 208. The hardcoding may be done to reduce decision overhead.

In one or more embodiments, users of mobile devices may subscribe to service(s) associated with the control of access to wireless signals (and, services) described above. In an example scenario, when vehicle 234 is moving, controlled area 238 may be associated with a hospital. In other words, at least a part of the hospital may be included within controlled area 238. In one or more embodiments, the whitelist maintained at server 202 (or, hardcoded into a vBTS) may include identification data associated with the subscribers of the service(s) described above. Thus, specific wireless service(s) to a subscriber (e.g., user of mobile device 220) may be permitted or denied, depending on preference and/or the location thereof.

In another scenario, the whitelist may include information associated with doctors and/or staff of the hospital. Thus, when a doctor/staff user of mobile device 220 is within controlled area 238, at least a part of the wireless service(s) associated therewith may still be enabled so that the user may be able to attend to emergency calls and/or messages. Wireless service(s) associated with all others may be disabled when within controlled area 238. In yet another scenario, the user of mobile device 220 may be a VIP present in the whitelist. Thus, wireless service(s) associated therewith may be enabled all the time, regardless of whether the VIP falls within a controlled area (e.g., controlled area 238) or not. Wireless service(s) associated with mobile device 222 (e.g., in convoy 236, serving as a security guard to the VIP associated with mobile device 220) may also be enabled all the time.

In another example embodiment, permission associated with delivery of an advertising message may be granted to mobile device 220 through BSC 208 when mobile device 220 is within controlled area 238. For example, delivery of the advertising message may be based on the location of mobile device 220 and/or demographic data associated with the user of mobile device 220. The demographic data, for example may be stored in server 202. The advertising message may be an SMS message (example of a text message) or an MMS message. In one or more embodiments, the demographic data of the user of mobile device 220 may be stored in correspondence with the identity of mobile device 220.

In one or more embodiments, as discussed above, BSC 208 may determine that mobile device 220 has entered controlled area 238 based on the detection thereof by antenna 216 and/or antenna 218. The "network" listener BTS 210 may be configured to enable an increased signal level of the appropriate antenna (e.g., antenna 216, antenna 218) whose coverage area includes mobile device 220 such that the signal level of the appropriate antenna is greater than the signal level associated with the cell site. In one or more embodiments, although controlled area 238 is associated with the coverage areas of both antenna 216 and antenna 218, the ability to suitably increase the signal level of the appropriate antenna alone may contribute to power savings. Mobile device 220 may be deemed to have moved outside controlled area 238 based on the failure of antenna 216 and antenna 218 to detect mobile device 220. It is obvious that more than two antennas may be utilized to detect the location of mobile device 220. Also, it is obvious that the detection may be done through merely one antenna, and that the number of BTSs may be varied.

Figure 3:
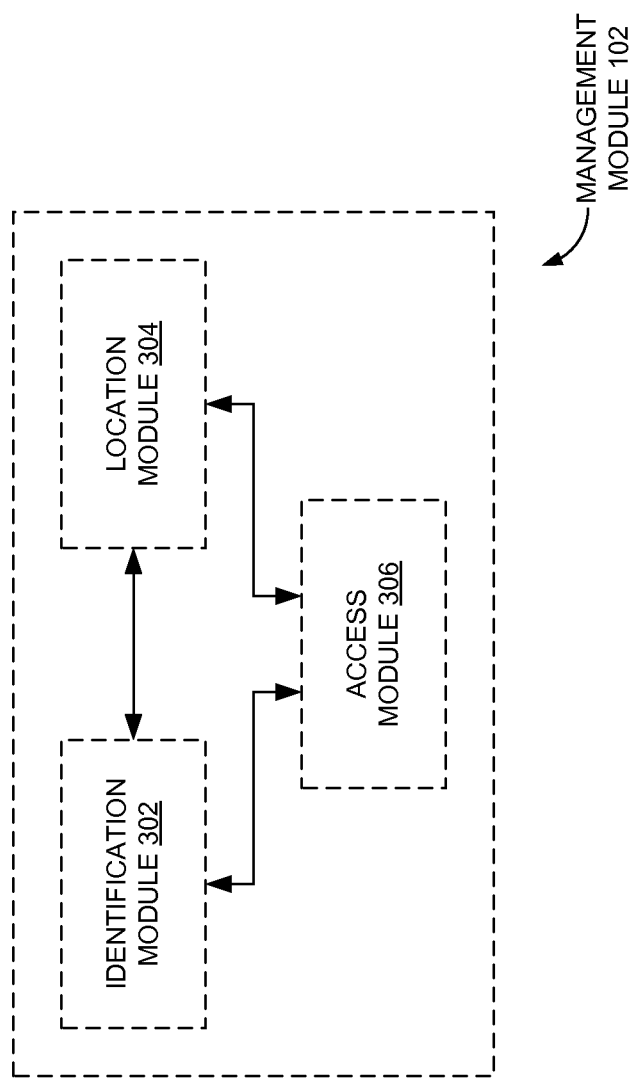
FIG. 3 is a schematic view of a management module associated with the mobile communication system of FIG. 1, according to one or more embodiments.

FIG. 3 shows management module 102 of FIG. 1, according to one or more embodiments. In one or more embodiments, through identification module 302 of management module 102 associated with BSC 120, BSC 120 may determine the identity of mobile device 112$_1$ within coverage area 110 (and, coverage area 138) through the association of mobile device $112_1$ with the signal of antenna 106 (and, antenna 108) associated with BTS 118. In one or more embodiments, the identity of mobile device $112_1$ may be based on the IMSI number or the IMEI number thereof, as discussed above. In one example embodiment, identification module 302 may relay the identification information to the appropriate BTS/BSC 120 associated with server 116, where the identification information may be matched with the profile data stored.

In one or more embodiments, management module 102 may include a location module 304 to determine the location of mobile device $112_1$ based on the detection thereof by antenna 106 (and, antenna 108). In one or more embodiments, location module 304 may also determine the location of mobile device $112_1$ and notify identification module 302 when the location of mobile device $112_1$ is within coverage area 110 (and, coverage area 138).

In one or more embodiments, management module 102 may also include an access module 306 configured to enable access to the control of wireless signal(s) when mobile device $112_1$ is within coverage area 110. In one or more embodiments, access module 306 may be configured to enable access to the control of wireless signal(s) to/from mobile device $112_1$ based on the identification information thereof. It is obvious that identification module 302, location module 304 and/or access module 306 may merely reside as a set of instructions (e.g., software) on server 116. FIG. 3 also shows communication between identification module 302 and access module 306, and location module 304 and access module 306.

In one or more embodiments, upon detection of mobile device $112_1$ within coverage area 110, the appropriate BTS (e.g., BTS 118) may be configured to broadcast a control signal. As discussed above, the aforementioned control signal may be stronger than the wireless signal associated with cell site 126. Mobile device $112_1$ may, therefore, be configured to reselect the stronger signal instead of the wireless signal(s) from cell site 126. Thus, in one or more embodiments, the control unit associated with mobile communication system 100, including antenna 106, antenna 108, BTS 118, BSC 120, and/or other components associated therewith, may mimic a system including jammers to restrict access of mobile phone $112_1$.

Figure 4:
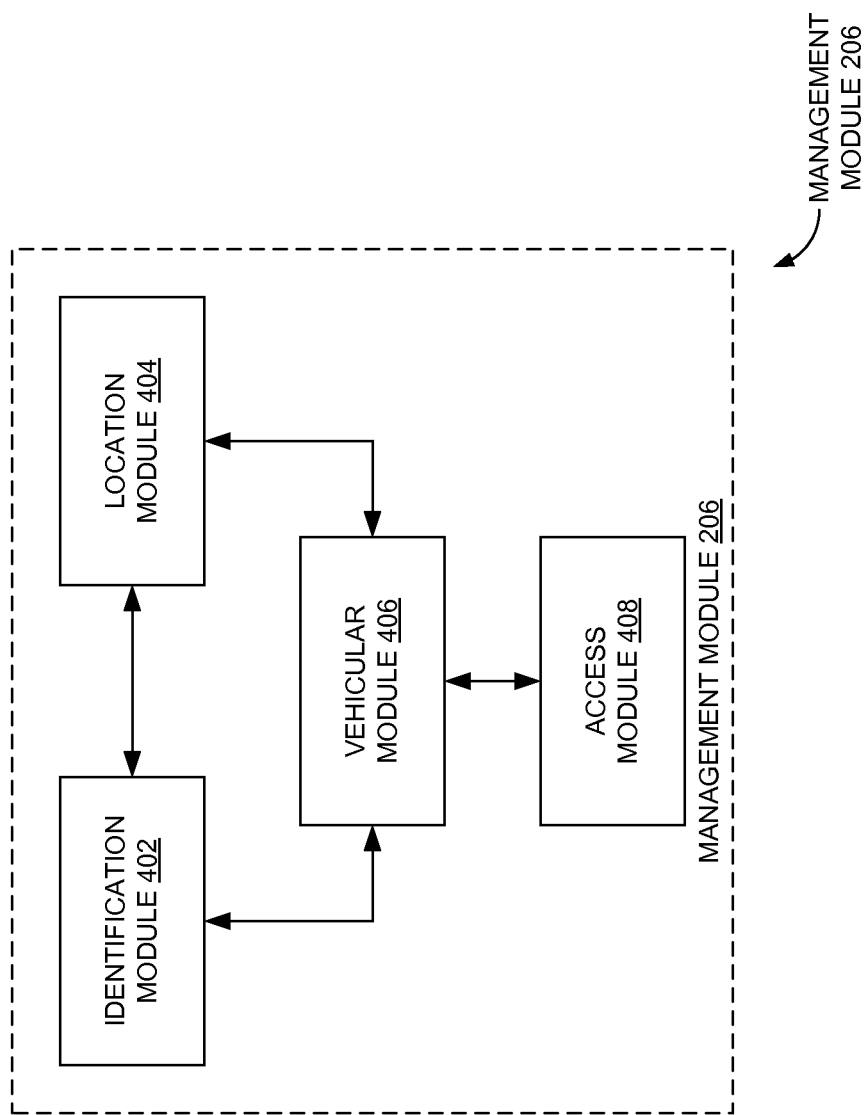
FIG. 4 is a schematic view of a management module associated with the vehicular mobile communication system of FIG. 2, according to one or more embodiments.

FIG. 4 shows management module 206 of FIG. 2, according to one or more embodiments. In one or more embodiments, through identification module 402 of management module 206 associated with BSC 208, BSC 208 may determine the identity of mobile device 220 inside the moving vehicle 234 through the association of mobile device 220 with the signal of antenna 216 and/or antenna 218 of BTS 212 and BTS 214 respectively. In one or more embodiments, again, the identity of mobile device 220 may be based on the IMSI number or the IMEI number thereof. In one or more embodiments, management module 206 may include a location module 404 to determine the location of mobile device 220 based on the detection thereof through antenna 216 and/or antenna 218 that are coupled to the BTSs, as discussed above. In one or more embodiments, location module 404 may also determine the location of mobile device 220 and notify identification module 402 when the location of mobile device 220 is within controlled area 238.

In one or more embodiments, management module 206 may also include an access module 408 configured to enable access to the control of wireless signal(s) when mobile device 220 is within controlled area 238. In one or more embodiments, access module 408 may be configured to communicate with vehicular module 406, which, in one embodiment, may be mounted on vehicle 234 or associated with mobile device 220. In one or more embodiments, vehicular module 406 may include an antenna (not shown) configured to relay information to an appropriate BTS/BSC 208 associated with server 202. For example, once mobile device 220 is within controlled area 238, vehicular module 406 may relay location information and/or identification information to the appropriate BTS/BSC 208. Based on the identification information, access module 408 may enable access to the control of wireless signal(s) to mobile device 220 to mobile system controller 250 (or, BSC 208). It is to be noted that although wireless service(s) associated with all mobile devices detected through the appropriate antenna(s) may be restricted, MNO 232 involvement may cause the restriction to be based on location and identification thereof.

FIG. 4 shows vehicular module 406 as part of management module 206, which implies that vehicular module 406 may relay information to the appropriate BTS/BSC 208 associated with server 202. It is obvious that vehicular module 406 may merely reside as a set of instructions (e.g., software) in server 202, analogous to identification module 402, location module 404 and/or access module 408. In another example embodiment, vehicular module 406 may lie outside management module 206. In one or more embodiments, vehicular module 406 may communicate with identification module 402 and/or location module 404 to transfer information thereof.

Again, in one or more embodiments, upon detection of mobile device 220 within controlled area 238, the appropriate BTS may be configured to broadcast a control signal (e.g., Broadcast Control Channel (BCCH) signal). As discussed above, the aforementioned control signal may be stronger than the wireless signal associated with cell site 228 and cell site 230. Mobile device 220 may, therefore, be configured to reselect the stronger signal instead of the wireless signal(s) from cell site 228 and cell site 230. Thus, in one or more embodiments, mobile system controller 250 may, again, mimic a system including jammers to restrict access of mobile phone 220.

FIG. 5 shows a database 500 of information associated with the mobile device(s) stored at server 116 of FIG. 1, according to one or more embodiments. In one or more embodiments, database 500 may include fields such as mobile device 502 (e.g., mobile device $112_1$, mobile device $112_2$, mobile device $112_3$, mobile device $112_4$), identity 504 (e.g., identification information associated with the corresponding mobile device), location 506 (e.g., location information associated with the corresponding mobile device; shown as coverage area 110, outside coverage area 110, unknown), and access 508 information (e.g., restricted, not in coverage area, granted). It is obvious that other fields may be included in database 500 and/or may substitute the fields shown in FIG. 5.

For example, mobile device $112_1$ may have unique identification information (e.g., 310150123456789) associated therewith, which may be stored at server 116. As shown in FIG. 5, when mobile device $112_1$ is within coverage area 110, access to the wireless service(s) associated therewith may be restricted through BSC 120. When mobile device $112_4$ is within coverage area 110, access to the wireless service(s) associated therewith may still be granted. The aforementioned permission and/or restriction may also be effected in conjunction with MNO 124, as discussed below.

In one or more embodiments, MNO 124 and/or third-parties may be provided access to database 500. To summarize, in one or more embodiments, mobile devices entering coverage area 110 may be interrogated through BSC 120 and the details thereof captured and stored at server 116. In one or more embodiments, the aforementioned details associated with all the mobile devices within coverage area 110 may be made available to MNO 124 and/or third parties. In one example embodiment, the wireless service(s) associated with mobile device 112$_1$ may be disabled through MNO 124 when mobile device 112$_1$ is within coverage area 110. In another example embodiment, the wireless service associated with mobile device 112$_1$ may be rendered controllable through MNO 124 when mobile device 112$_1$ is within coverage area 110.

Figure 6:
FIG. 6 is a schematic view of a database of information associated with mobile device(s) stored at a server in the vehicular mobile communication system of FIG. 2, according to one or more embodiments.

FIG. 6 shows a database 600 of information associated with mobile devices stored at server 202 of FIG. 2, according to one or more embodiments. In one or more embodiments, database 600 may include fields such as mobile device 602 (e.g., mobile device 220, mobile device 222, mobile device 224, mobile device 226), identity 604 (e.g., identification information associated with the corresponding mobile device), location 606 (e.g., location information associated with the corresponding mobile device; shown as within controlled area 238, outside controlled area 238), vehicle 608 (e.g., vehicle 234, convoy 236, unknown), and access 610 information (e.g., granted, not granted). It is obvious that other fields may be included in database 600 and/or may substitute the fields shown in FIG. 6. For example, mobile device 220 may have unique identification information (e.g., 82569) associated therewith, which may be stored at server 202. As shown in FIG. 6, when mobile device 220 is within controlled area 238 by way of vehicle 234 being in controlled area 238, access to the wireless service associated with mobile device 220 may be granted to BSC 208.

In one or more embodiments, MNO 232 and/or third-parties may be provided access to database 600. To summarize, in one or more embodiments, mobile devices entering controlled area 238 may be interrogated through BSC 208 and the details thereof captured and stored at server 202. In one or more embodiments, the aforementioned details associated with all the mobile devices within controlled area 238 may be made available to MNO 232 and/or third parties. In one example embodiment, the wireless service associated with mobile device 220 inside the moving vehicle 234 may be disabled through MNO 232 when mobile device 220 is within controlled area 238. In another example embodiment, the wireless service associated with mobile device 220 inside the moving vehicle 234 may be rendered controllable through MNO 232 when mobile device 220 is within controlled area 238.

Figure 7:
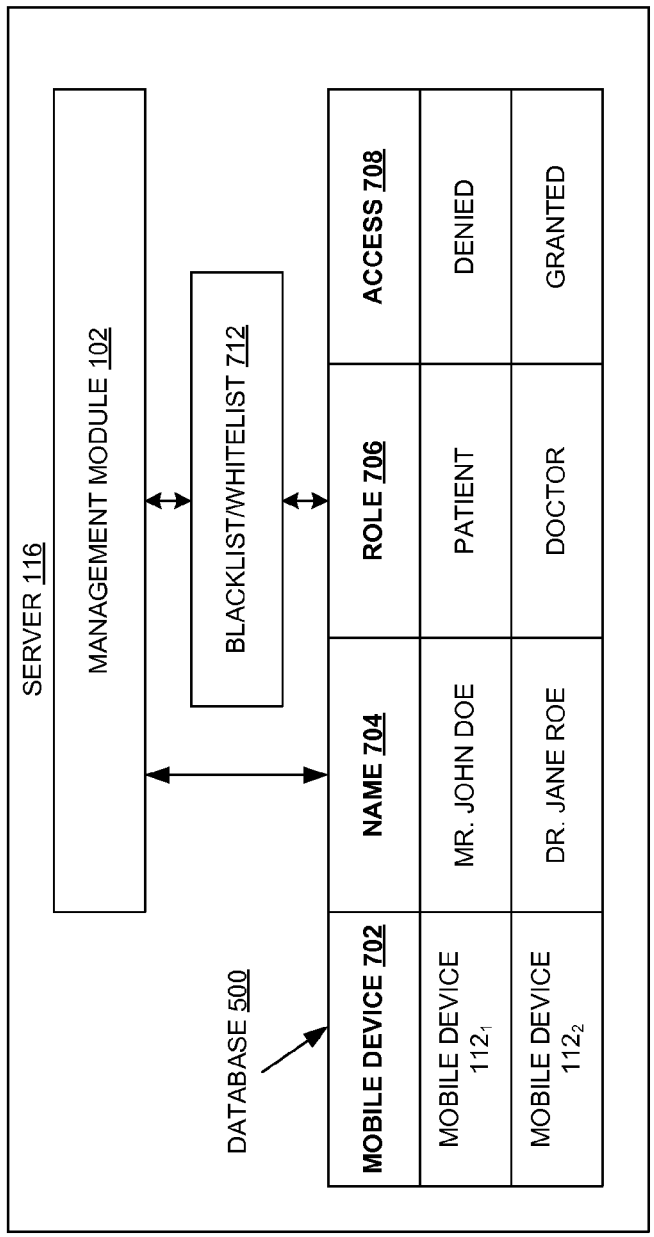
FIG. 7 is a schematic view of the server in the mobile communication system of FIG. 1, according to one or more embodiments.

FIG. 7 shows server 116 of FIG. 1, according to one or more embodiments. In one or more embodiments, server 116 may include management module 102, as also shown in FIG. 1. In one or more embodiments, the blacklist and/or the whitelist (e.g., blacklist/whitelist 712) discussed above may be stored on server 116 and/or central management server 140. In an alternate embodiment, the blacklist and/or the whitelist may be hardcoded into a vBTS associated with BSC 120, as discussed above. In one or more embodiments, based on a presence/absence on the blacklist and/or the whitelist, mobile device 112$_1$, when within coverage area 110, may be permitted or denied access to wireless service(s) associated with MNO 124 through an appropriate BTS (e.g., BTS 118; specifically, antenna 106 associated therewith) transmitting a signal stronger than the signal associated with the wireless service(s). In one or more embodiments, as shown in FIGS. 5 and 7, server 116 may have database 500 associated therewith, which includes information associated with the mobile devices stored therein.

FIG. 7 shows database 500 with fields such as mobile device 702 (e.g., mobile device 112$_1$, mobile device 112$_2$, mobile device 112$_3$, mobile device 112$_4$), name 704 (e.g., Mr. John Doe, Dr. Jane Doe), role 706 (e.g., doctor, patient), and access 708 (e.g., granted, denied). For example, Mr. John Doe may be a patient in a hospital and may be user 114$_1$. Wireless service(s) associated with Mr. John Doe may be disabled when within coverage area 110 (here, hospital). Jane Roe may be a doctor in the hospital and may be user 114$_4$. Wireless service(s) associated with Dr. Jane Roe may be enabled even when within coverage area 110 (again, here, hospital). Again, it is obvious that database 300 may be implemented in other ways, and that alternate implementations are within the scope of the exemplary embodiments discussed above.

Figure 8:
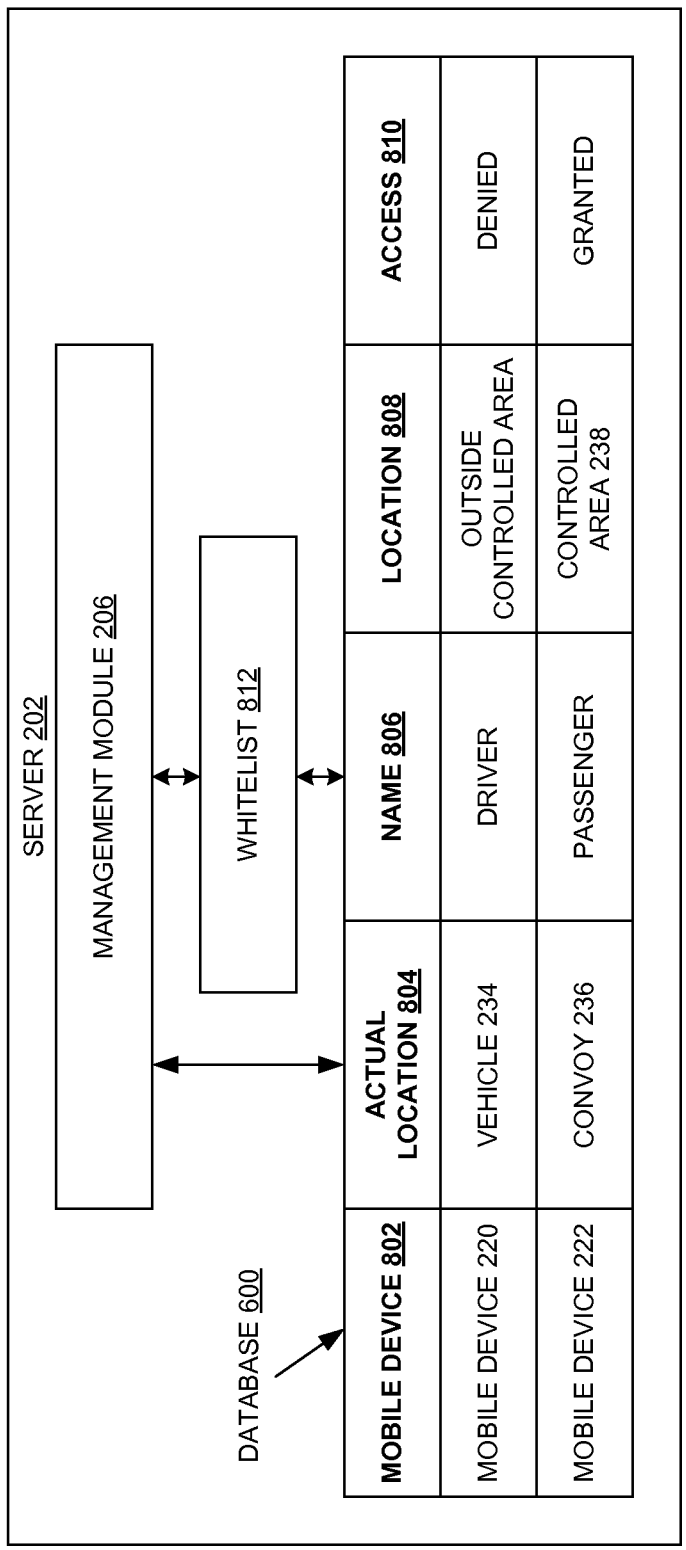
FIG. 8 is a schematic view of the server in the vehicular mobile communication system of FIG. 2, according to one or more embodiments.

FIG. 8 shows server 202, according to one or more embodiments. In one or more embodiments, server 202 may include management module 206, as also shown in FIG. 2. In one or more embodiments, the whitelist (e.g., whitelist 812) discussed above may be stored on server 202 (or, hardcoded into a vBTS). In one or more embodiments, based on a presence/absence on the whitelist, mobile device 220, when within controlled area 238, may be permitted or denied access to wireless service(s) associated with MNO 232 through an appropriate BTS (and the antenna associated therewith) transmitting a signal stronger than the signal associated with the wireless service(s). In one or more embodiments, as shown in FIGS. 6 and 8, server 202 may have database 600 associated therewith, which includes information associated with the mobile devices stored therein.

FIG. 8 shows database 600 with fields such as mobile device 802 (e.g., mobile device 220, mobile device 222), actual location 804 (e.g., vehicle 234, convoy 236), type of user (e.g., name 806; e.g., driver, passenger), location 808 (e.g., within controlled area 238, outside controlled area 238) and access 810 (e.g., granted, denied). Again, it is obvious that database 600 may be implemented in other ways, and that alternate implementations are within the scope of the exemplary embodiments discussed above.

Thus, exemplary embodiments discussed above enable control of access of wireless service(s) to mobile devices when the aforementioned mobile devices are within regions requiring social sensitivity (e.g., regions including prayer halls, religious places of worship, cinema halls, hospitals, classrooms). Although, FIG. 2 shows mobile device 220 within the moving vehicle 234, the concepts involved herein also apply to scenarios where vehicle 234 comes to a halt.

Figure 9:
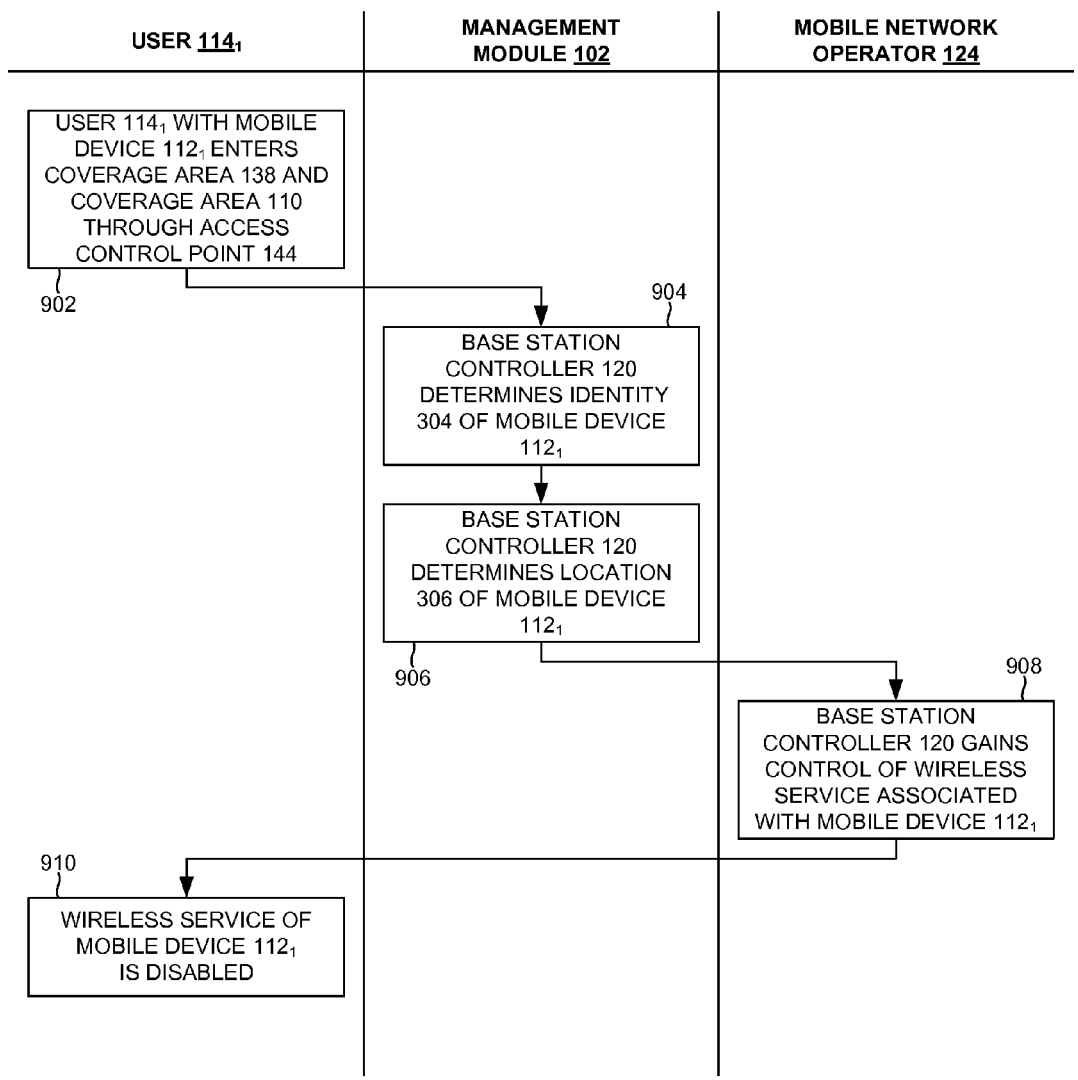
FIG. 9 is a data flow diagram associated with controlling wireless service of a mobile device in the mobile communication system of FIG. 1, according to one or more embodiments.

FIG. 9 shows a data flow diagram associated with controlling the wireless service of a mobile device 112$_1$, according to one or more embodiments. In one or more embodiments, in operation 902, user 114$_1$ with mobile device 112$_1$ may enter coverage area 138 and coverage area 110 (e.g., through access control point 144). In one or more embodiments, in operation 904, BSC 120 determines the identity (e.g., identity 504) of mobile device 112$_1$. Then, in one or more embodiments, in operation 906, BSC 120 may determine the location (e.g., location 906) of mobile device 112$_1$ within coverage area 110 based on the detection thereof through antenna 106. In one or more embodiments, in operation 908, BSC 120 may gain control of the wireless service(s) associated with mobile device 112$_1$. In one or more embodiments, in operation 910, the wireless service(s) associated with mobile device 112$_1$ may be disabled through BSC 120 in conjunction with MNO 124.

As shown in FIG. 9, operations 902 and 910 are at the user (e.g., user 114$_1$) level, operations 904 and 906 are at management module 102 level and operation 908 is at MNO 124 level. It is obvious that FIG. 9 is merely an example, and that other forms of control (e.g., enabling access, enabling partial access, disabling partial access) are well within the scope of the exemplary embodiments.

It is obvious that the possible applications of the wireless (or, mobile) service control of the mobile devices are not restricted to the scenarios discussed above. In one or more embodiments, the aforementioned wireless service control may be provided as a subscription service to customers. For example, mobile service providers may have service agreements (e.g., Service Level Agreements (SLAs)) for users in mobile communication system 100 and/or mobile communication system 200 to provide levels of wireless service control. The mobile service provider(s) (e.g., MNO 124, MNO 232) may be the party providing the wireless service control. Alternately, the mobile service provider(s) may provide the wireless service control in conjunction with a provider dedicated solely to the wireless service control. In one or more embodiments, the aforementioned levels may be associated with tiers of service (e.g., number of parameters controlled such as voice messages, SMSs, phone calls), type of customer/user (e.g., VIP (e.g., prominent government servant) subscriber, ordinary subscriber), a time of service, a date of service, a duration of service and/or location of service (e.g., public location requiring social sensitivity, private location). Association(s) of the levels of service with other parameters is within the scope of the exemplary embodiments.

In one or more embodiments, the customers/users may opt for the wireless service control discussed above in a service plan devised through the mobile service provider. In one or more embodiments, the service plan may be chosen from a list of service plans available through the mobile service provider. For example, the service plan may provide selective restriction of wireless/mobile service(s) in public locations requiring social sensitivity based on a cost-based model. Mere restriction of phone calls may cost an example $9.99 per month, and restriction of phone calls, SMSs, MMSs and mobile service provider alerts may cost an example $19.99 per month. Additionally, the service plan(s) provided through the mobile service provider may include choice of private location(s) for control of wireless service(s) associated with the user/customer therein. The user/customer may be provided the option to choose one or more location(s) through, for example, a mobile device (e.g., mobile device 112₁, mobile device 220) associated therewith.

In an example scenario, the mobile service provider may provide options to subscribe for new service(s)/additional service(s) relating to wireless communication control associated with a mobile device through a user interface (e.g., display of the mobile device) thereon. A user/customer of the mobile service provider may opt for a new wireless communication control service by pressing a button representing an appropriate choice. The user/customer may also opt for additional service(s) through, again, pressing a button representing the appropriate choice. As there may be a default number of additional locations available, the user/customer may search for the desired locations and/or may be provided a list of desired locations based on the profile data thereof. Alternately, the user/customer may type in an address (e.g., office premises) at which wireless service control is desired. If the wireless service control is available at the typed address (or, the location desired by the user/customer), the user/customer may opt for additional wireless service control at the aforementioned location/address. If the wireless service control is not available at the location/address, the user/customer may be prompted appropriately.

Figure 10:
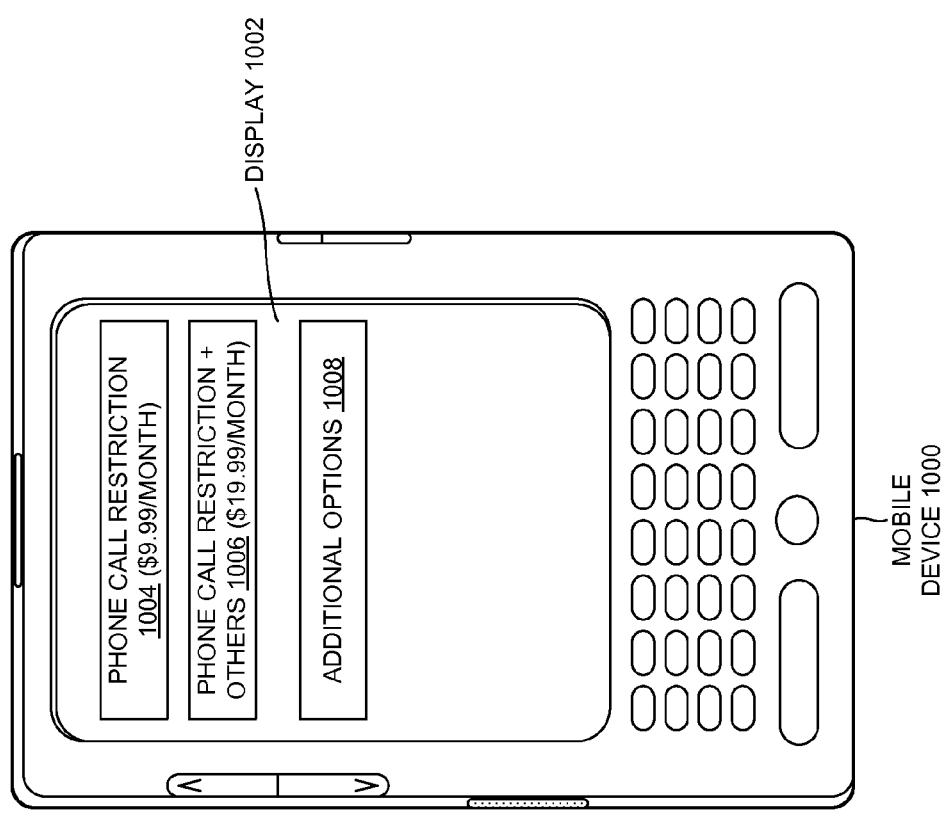
FIG. 10 is a schematic view of a mobile device of FIG. 1 and/or FIG. 2 showing subscription options, according to one or more embodiments.

FIG. 10 shows a mobile device 1000 (e.g., mobile device 112₁, mobile device 220) including subscription options, according to one or more embodiments. In the example embodiment shown in FIG. 10, display 1002 of mobile device shows the subscription options discussed above, viz., phone call restriction ($9.99/month) 1004 and phone call restriction+others ($19.99/month) 1006. The user of mobile device 1000 may choose one of the two options to subscribe to the wireless service control available through the mobile service provider. Upon subscription to the wireless service control, the user/customer may be charged therefor on a periodic (e.g., monthly) basis.

Phone call restriction+others ($19.99/month) 1006 refers to the phone call restriction service, along with the text message (e.g., SMS)/multimedia message (e.g., MMS)/service provider alert restriction discussed above. The provision of other options is within the scope of the exemplary embodiments. Also, the user/customer may subscribe to the wireless service control through other means such as over phone (e.g., landline, mobile phone, Voice over Internet Protocol (VoIP) phone), shop promotion and mail subscription. Variations herein are also within the scope of the exemplary embodiments.

Figure 11:
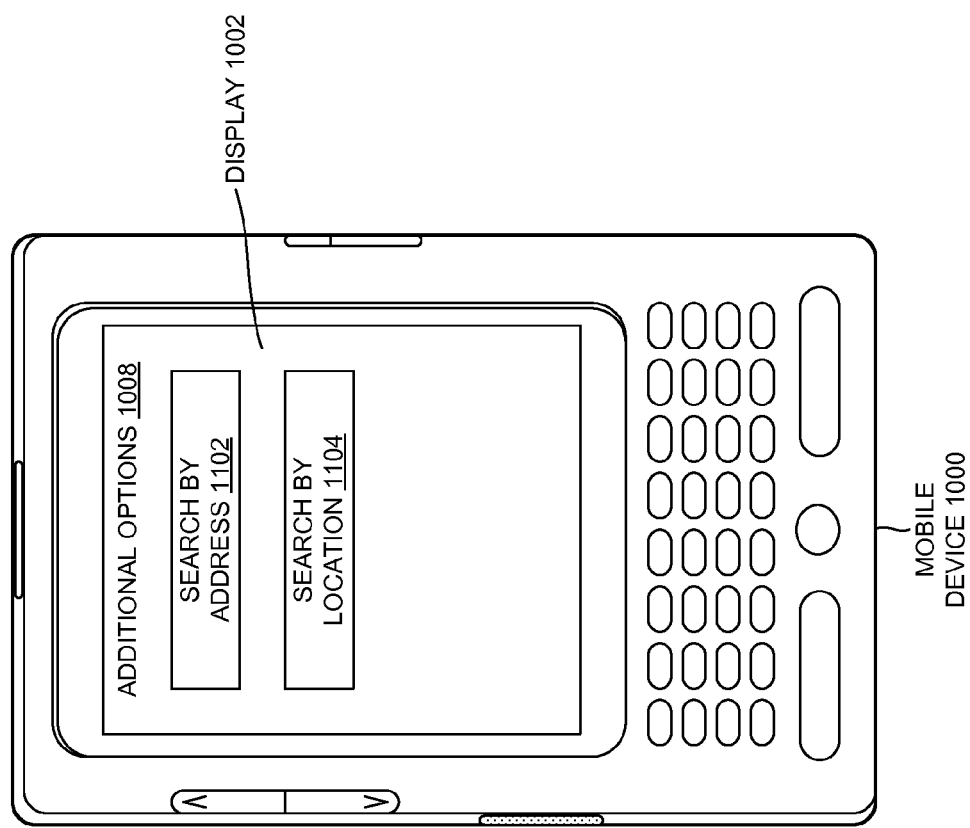
FIG. 11 is a schematic view of additional options associated with the wireless service control subscription of FIG. 10, according to one or more embodiments.

In the example embodiment shown in FIG. 10, additional options 1008 may be provided through display 1002 of mobile device 1000; the user/customer may click additional options 1008 to choose other available means for wireless service control. FIG. 11 shows additional options 1008 for wireless service control, according to one or more embodiments. The display screen associated with additional options 1008 may include a search by address 1102 option and a search by location 1104. Upon the user/customer clicking the search by address 1102 option, the user/customer may type the address at which wireless service control is required and subscribe to the service by subsequently clicking a button associated therewith. Upon the user/customer clicking the search by location 1104 option, the user/customer may narrow down the search space of the exact location of the service requirement through, for example, clicking by city first, then area, then street etc. Alternately, upon clicking the search by location 1104 option, the user/customer may be provided the option to narrow down the search space through choosing landmarks near the exact location of the service requirement.

A database including locations of service (i.e., wireless service control) availability may be stored in a memory associated with the mobile device of the user/customer and/or a memory associated with a server associated with the service provider to which communication is established once the user/customer clicks the abovementioned options. The database may be leveraged to check as to whether the wireless service control is available at the location(s) requested by the user/customer. As discussed above, when the wireless service control is unavailable at the location(s) chosen by the user/customer, the user/customer may be appropriately prompted. Alternately, the mobile device of the user/customer may leverage a geospatial capability (e.g., a Global Positioning System (GPS) capability provided on the mobile device; the ability to leverage GPS) thereof to determine the availability of service at the location(s) chosen/desired by the user/customer.

In one or more embodiments, the wireless service control may be provided on a time/date basis. For example, the user/customer may click the abovementioned options, following which the user/customer may be required to choose between service on a regular basis (for which the user/customer is billed periodically) or service on an occasional basis (e.g., for one or more date(s)/time(s)). Service on an occasional basis may involve the user/customer typing/choosing appropriate date(s)/time(s) of service for which the user/customer is charged. The user/customer may receive a consolidated bill from the service provider for the service(s) subscribed to. For example, a monthly statement from the service provider may include charges associated with the abovementioned subscription, including the service on the occasional basis.

Alternately, the user/customer may opt not to subscribe to the wireless service control on a "long term" basis. If the user/customer has pre-paid for his/her mobile service, the user/customer may purchase wireless service control for predetermined date(s)/time(s) at predetermined location(s). The "pre-paid" balance amount corresponding to the mobile service associated with the user/customer may be reduced by an amount corresponding to the wireless service control purchased.

It is obvious that the abovementioned scenarios of subscription are mere examples, and that other ways of subscription availability are within the scope of the exemplary embodiments. For example, the user/customer may subscribe by snail mail based on promotional material available from the service provider, by phone or by the Internet. The "long-term" subscription(s) may be patronized by, for example, working people who frequently attend official meetings that require silence. In addition, the working people may prefer to switch off the mobile devices thereof while at office. The wireless service control subscription may allow for automatic disabling of wireless service(s) associated therewith. Therefore, the manual switching off of mobile devices may not be required. As subscribers may possess the capability to opt for selective restriction of wireless service(s), at least a portion of the wireless service(s) may be active even when the subscription to the wireless service control is active.

The organization associated with one or more of the abovementioned working people may subscribe to the wireless service control. As the mobile devices of one or more of the abovementioned working people may be provided by the organization, the aforementioned mobile devices may have automatically subscribed to the wireless service control. Here, the organization may opt to pay the bills associated with the abovementioned working people. Alternately, the billing may be done on an individual basis, and the concerned individuals may be reimbursed by the organization associated therewith.

The subscription on the occasional basis may be associated with individual(s) or organization(s) having the need for wireless service control on a short-term basis. For example, a user/customer may require wireless service control during a top secret meeting (e.g., classified matter discussion), where any sort of mobile device has to be in an inactive mode (e.g., switched off). Here, wireless service control may substitute the manual switching off of the mobile device(s).

Figure 12:
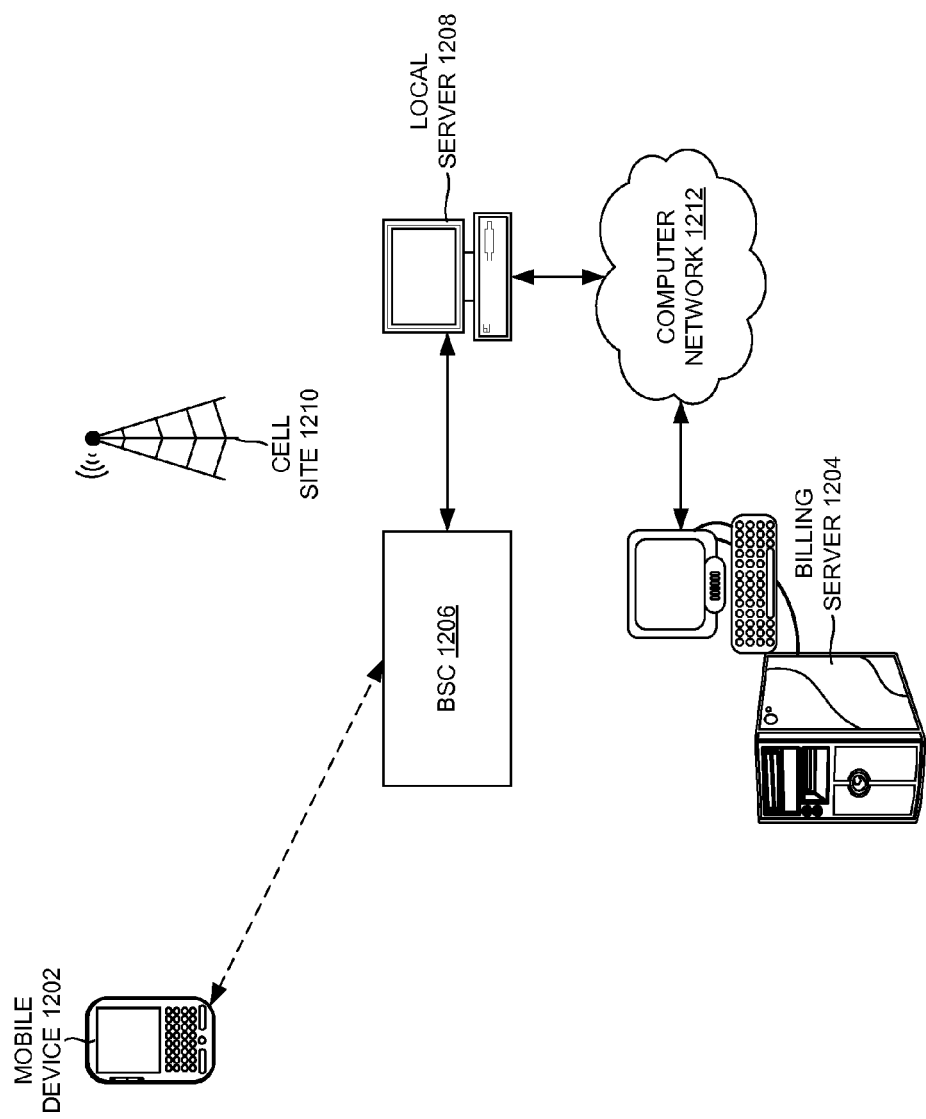
FIG. 12 is a schematic view of billing associated with control of wireless service of a mobile device of FIG. 1 and/or FIG. 2, according to one or more embodiments.

Wireless service(s) associated with mobile devices may be controlled at, for example, prison locations, hospitals, schools, religious places of worship etc. FIG. 12 shows billing associated with a mobile device 1202 (e.g., mobile device $112_1$, mobile device 220; or, mobile device 1000), according to one or more embodiments. In one or more embodiments, a billing server 1204 (an example data processing device) may be associated with BSC 1206 (e.g., BSC 120, BSC 208), and may be configured to generate a consolidated bill with regard to the wireless service control subscription. In one or more embodiments, billing server 1204 may be the same as server 116 or server 202. In one or more embodiments, billing server 1204 may also be associated with MNO 124 (e.g., central management server 140) or MNO 232.

In one example embodiment, for purposes of billing, the credit/debit card information associated with the user/customer of mobile device 1202 may be stored therein and/or in a database (not shown) associated with billing server 1204 in order to enable the credit/debit card associated with the user/customer to be charged. In one or more embodiments, the charging of the credit/debit card of the user/customer may be preferred in the "service on the occasional basis" case. The convenience of paying through credit/card debit card may enable users/customers having no subscription to the regular mobile services associated with a mobile service provider to purchase wireless service control on the occasional basis. For example, a lot of the mobile service providers may tie up with the wireless service control provider, thereby enabling subscribers thereof to avail of the wireless service control. This may obviously generate revenue for the mobile service provider(s).

As discussed above, in one or more embodiments, the identification information of mobile device 1202 may be stored at central management server 140, server 116, server 202 and/or billing server 1204. Thus, in one or more embodiments, the consolidated bill associated with a user/customer may be generated based on the identification information and the service(s) subscribed to. In one or more embodiments, the profile data of the user/customer of mobile device 1202, which may also be stored at billing server 1204, may include the credit/debit card information and/or the bank account information associated therewith. Thus, in one or more embodiments, the user/customer may authorize billing server 1204 to charge the credit/debit card associated therewith or debit the bank account associated therewith on a periodic (e.g., monthly) basis. In one or more preferred embodiments, billing server 1204 may generate the consolidated bill and transmit the same to the user/customer periodically (e.g., monthly). In one or more embodiments, the user/customer may then pay the amount corresponding to the bill through means such as credit/debit card, bank account transfer, check (e.g., by snail mail) etc.

In one example scenario, the user/customer may have purchased a pre-paid Subscriber Identity Module (SIM) card or the like through a mobile service provider. When the user/customer opts for the additional wireless service control, the balance amount corresponding to the SIM card may be reduced by an appropriate amount associated with the wireless service control. The abovementioned modes of payment may also be combined. For instance, the user/customer may have a balance amount associated with the pre-paid SIM card but may opt to pay for the wireless service control by credit/debit card.

In one or more embodiments, the identification information associated with the user/customer may be utilized to authenticate communication between the user/customer and MNO 124 or MNO 232. In one or more embodiments, the aforementioned identification information may also include the credit/debit card/bank account information associated with the user/customer. In one or more embodiments, the identification information may be stored in a local server 1208 (another example data processing device; e.g., server 116, server 202) associated with the cell sites (e.g., cell site 126, cell site 228, cell site 230). In one or more embodiments, local server 1208 may be configured to generate the consolidated bill associated with the user/customer and/or may be configured to transmit the information associated with the user/customer to billing server 1204, which then generates the consolidated bill associated with the user/customer. FIG. 12 also shows cell site 1210 (e.g., cell site 126, cell site 228, cell site 230), to which communication occurs through the identification information associated with the user/customer. Also, as discussed above, local server 1208 may be associated with cell site 1210, and/or may be coupled to billing server 1204 through a computer network 1212 (e.g., Internet).

In one or more embodiments, as discussed above, the user/customer may pay for the wireless service control in accordance with a service agreement between the user/customer and the service provider (e.g., mobile service provider providing the wireless service control, wireless service control provider). In one or more embodiments, the service agreement may include tiers of service (e.g., based on the number of parameters controlled, the number of locations controlled, the type of entity (e.g., person, organization) seeking the service), again as discussed above. For example, the more the number of parameters controlled, the more the user/customer may have to pay the service provider.

In one or more embodiments, the user/customer may choose different parameters to be controlled and/or different locations of wireless service control based on requirement, necessity, budget and/or preference. In one or more embodiments, the user/customer may have entered into service agreements associated with other service(s) such as Internet and/or landline phone. Thus, in one or more embodiments, the consolidated bill generated through billing server 1204 may also include the amount associated with the other service(s). In one or more embodiments, the user/customer may then make a consolidated payment toward all charges associated with service(s) subscribed to.

In one or more embodiments, the difference in pricing between subscriptions associated with a lesser number of parameters controlled and subscriptions associated with a higher number of parameters controlled is due to more of the infrastructure associated with the service provider being involved in service(s) associated with the higher number of parameters controlled.

Figure 13:
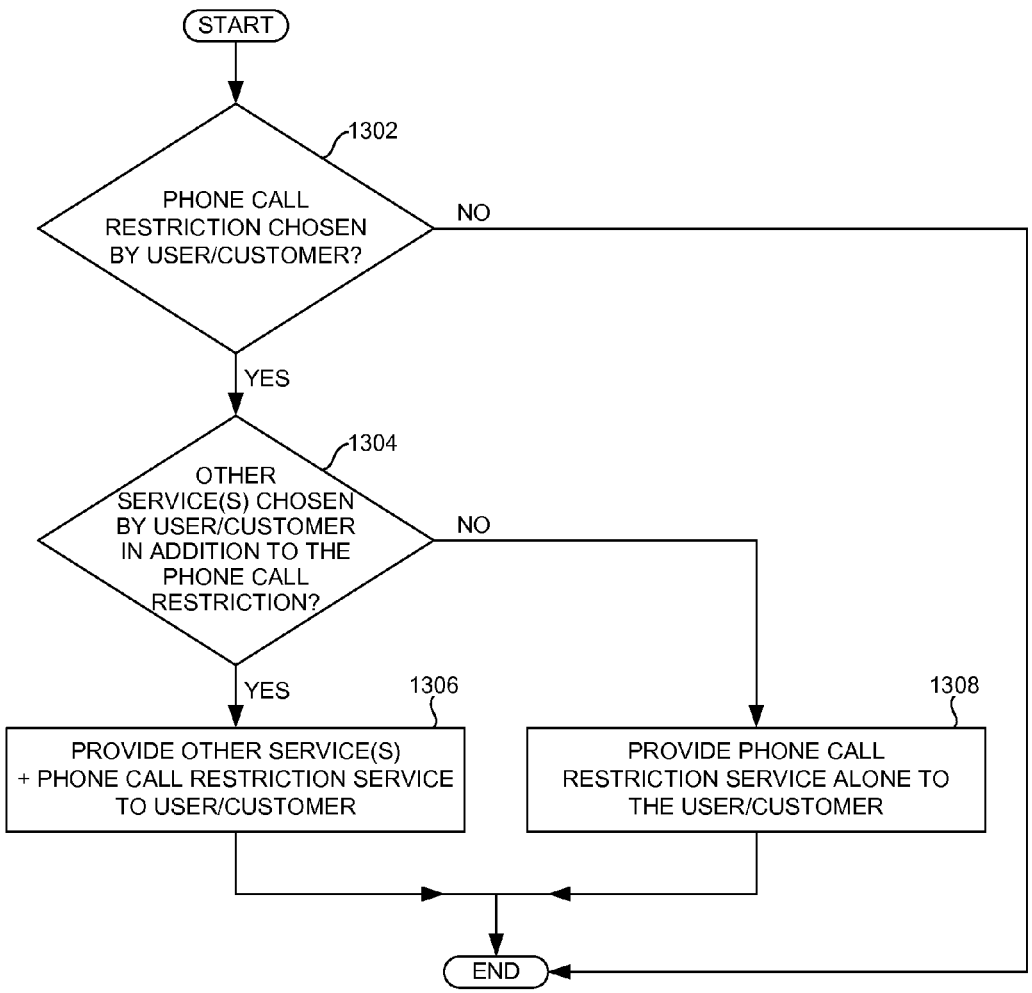
FIG. 13 is a flowchart detailing the operations involved in providing wireless service control to a user/customer of a mobile device of FIG. 1 and/or FIG. 2 based on the service chosen, according to one or more embodiments.

FIG. 13 shows a flowchart detailing the operations involved in providing wireless service control to a user/customer based on the service chosen, according to one or more embodiments. In one or more embodiments, operation 1302 may involve checking as to whether phone call restriction is chosen by the user/customer as part of the wireless service control provided by the appropriate service provider. In one or more embodiments, if yes, operation 1304 may involve checking as to whether other service(s) (e.g., MMS/SMS/service provider alert control) are chosen by the user/customer as part of the wireless service control provided by the appropriate service provider, in addition to the phone call restriction. In one or more embodiments, if yes, operation 1306 may involve the service provider providing wireless service control of the mobile device associated with the user/customer in accordance with the other service(s) chosen in addition to the phone call restriction. In one or more embodiments, if no, operation 1308 may involve the service provider providing the phone call restriction service alone. It is obvious that other ways of providing wireless service control and/or variations in implementations thereof are within the scope of the exemplary embodiments.

In one or more embodiments, in order to enforce the wireless service control based agreements discussed above and to enforce billing on the basis of the provided service, billing server 1204 may be appropriately configured. In one or more embodiments, billing server 1204 may enforce billing through a debit-credit mechanism, whereby the price associated with service(s) requested for (e.g., as per the service agreement) may be regarded as a "debit" amount, or, the amount that is billed to the user/customer. In one or more embodiments, the implementation of the debit-credit mechanism may include storing the cost(s) (e.g., as part of a data structure associated with the user/customer) associated with the levels of service(s) provided to the user/customer in a database associated with billing server 1204 (and/or local server 1208). In one or more embodiments, an amount associated with the service to the user/customer may then be automatically added (e.g., by accessing and updating the data structure) as a "debit" amount associated with the wireless service control invoice to the user/customer.

In one or more embodiments, whenever there is an interruption of service, impossibility of service, denial of service and/or a violation of the service agreement (e.g., accidentally through the service provider), billing server 1204 (or local server 1208) may "credit" the amount to the user/customer. In other words, in one or more embodiments, the amount that corresponds to the interruption of service, impossibility of service, denial of service and/or the violation of the service agreement may be subtracted from the "debit" amount. For example, the wireless service control requested by the user/customer (or, preferred service) may be compared (e.g., through a processor) to the actual wireless service control provided to the user/customer through analyzing data associated therewith. If the preferred service and the actual service do not correspond, an amount corresponding to the lack of correspondence may be determined (e.g., by prorating the cost(s) by accessing the data structure) and subtracted from the "debit" amount. In one or more embodiments, the consolidated bill for the user/customer may, thus, be generated through billing server 1204 (and/or local server 1208).

In one or more embodiments, cost(s) associated with wireless service control may be high when factors such as difficulty in installation of infrastructural equipment at/around the location(s) desired and lower number of cell site(s) at/around the location(s) desired are considered. Therefore, in one or more embodiments, the user/customer may have to pay a higher price when seeking wireless service control at the aforementioned location(s). Here, in one or more embodiments, the failure of the wireless service control herein may necessitate a higher refund to the user/customer than when the failure occurs at a location where provision of wireless service control is easier. In one or more embodiments, the pricing may also be uniform across all location(s) desired by users/customers.

In one or more embodiments, when the user/customer is unable to receive the wireless service control due to factors such as failure of infrastructure equipment maintained by the service provider, the cost associated with the wireless service control may be refunded to the user/customer through a debit-credit mechanism. As discussed above, the cost(s) associated with the wireless service control may be stored in the database associated with billing server 1204 (and/or local server 1208). The cost may be preset/predetermined based on the quantity of infrastructure equipment (e.g., BSCs, BTSs) being utilized for the wireless service control, the time of utilization thereof, the difficulty in utilization thereof, business model(s) associated with the service provider, demographic data etc. The preset/predetermined cost(s) associated with processes requiring to be initiated due to all tiers of wireless service control may be determined by the service provider and stored in a database as a reference.

Failure of the infrastructure equipment may, again, be determined through comparing data associated with the wireless service control provided to the user/customer with data associated with the preferred wireless service control because the differences therein correspond to the utilization of appropriate infrastructure equipment or a lack thereof. Alternately, status information associated with infrastructure equipment configured to be utilized during the wireless service control opted for by the user/customer may be transmitted to the control system (e.g., BSC 120, central management server 140 or server 116; mobile system controller 250, BSC 208 or server 202) associated with the mobile communication system (e.g., mobile communication system 100, mobile communication system 200) upon polling thereof through the control system. If the status information transmitted to the control system indicates a failure, the data structure associated with the wireless service control invoice to the user/customer may be appropriately updated.

Figure 14:
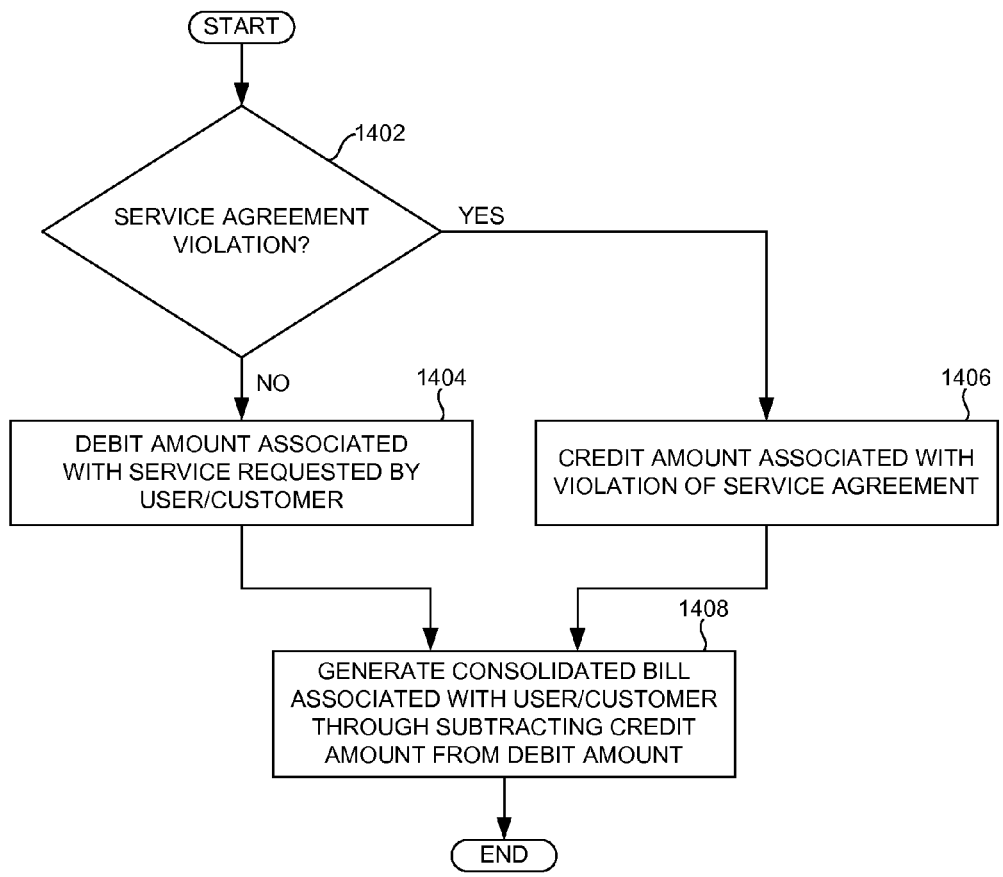
FIG. 14 is a flowchart detailing the operations involved in a debit-credit mechanism utilized in generating a user/customer bill through the billing server of FIG. 12, according to one or more embodiments.

FIG. 14 shows a flowchart detailing the operations involved in the debit-credit mechanism utilized in generating a user/customer bill through billing server 1204 (and/or local server 1208), according to one or more embodiments. In one or more embodiments, operation 1402 may involve checking for a service agreement violation (e.g., by comparing data associated with the preferred wireless service control with data associated with the actual wireless service control provided to the user/customer), the service agreement being between the user/customer and the service provider. In one or more embodiments, if there is no service agreement violation, operation 1404 may involve debiting the amount associated with the service requested by the user/customer. In one or more embodiments, if there is a service agreement violation, operation 1406 may involve crediting the amount associated with the violation (e.g., denial of service, interruption of service). In one or more embodiments, operation 1408 may then involve generating a consolidated bill associated with the user/customer through subtracting the credit amount from the debit amount.

In one or more embodiments, the abovementioned consolidated bill may be generated periodically (e.g., monthly) based on the user/customer preference and/or the policy of the service provider. It is obvious that the abovementioned debit/credit mechanism is merely an example and that other variations thereof are within the scope of the exemplary embodiments.

In one or more embodiments, the user/customer may be provided the capability to circumvent the wireless service control at his/her will. For the aforementioned purpose, in one example embodiment, the display screen associated with the wireless service control may show a "disable wireless service control" option that, when clicked, causes the wireless service control to cease. The user/customer may then click an "enable wireless service control" option again to resume the wireless service control. It is obvious that the aforementioned clicking of the "disable wireless service control" may not prevent the user/customer from being charged for the wireless service control. However, in another example embodiment, the user/customer may be prompted with another "disable wireless service control permanently" option upon clicking the "disable wireless service control" option. Upon subsequently clicking the "disable wireless service control permanently" option, the wireless service control may be permanently disabled (e.g., the user/customer may unsubscribe). Now, the user/customer may not be charged for the service from the time of disablement.

It is obvious that there are other ways of providing the "disabling" capability to the user/customer and that such ways are within the scope of the exemplary embodiments. Further, it is obvious that the disablement may be effected through the BSCs of FIG. 1 and/or FIG. 2. As discussed above, in one or more embodiments, cost(s) associated with the tiers of wireless service control and/or user/customer information may be stored in the database associated with billing server 1204 (and/or local server 1208). In one or more embodiments, whenever the user/customer opts to disable the wireless service control for the mobile device associated therewith and/or whenever the user/customer subscribes (e.g., the user/customer already availing the mobile service(s) of the service provider) to the wireless service control, the user/customer may first be authenticated based on an identifier thereof. If the user/customer is not authenticated, he/she is prevented from disabling the wireless service control and/or receiving the service associated therewith.

Following the authentication of the user/customer, the corresponding level of service may be retrieved from the database (an example memory associated with billing server 1204, local server 1208 and/or the BSCs of FIG. 1 and/or FIG. 2) in the case of a subscription. In the case of a temporary disablement, the corresponding level of service may be retrieved from the database and marked appropriately for temporary disablement. The use of infrastructure equipment involved in the levels of service may vary, and the invoice associated with the user/customer may be appropriately generated through the debit/credit mechanism discussed above. In one or more embodiments, the user/customer may also be provided the capability to modify levels of service.

As discussed above, in one or more embodiments, the user/customer may pay for the service through credit card, debit card, check etc. Again, the abovementioned option of billing/providing options to the user/customer is merely an example, and alternatives are within the scope of the exemplary embodiments. For example, the user/customer may be provided options through snail mail or a company promotional offer. The user may receive statement(s) associated with the consolidated bill periodically (e.g., monthly) through e-mail or snail mail. The user/customer may also pay for an immediate service thereto.

The term "user/customer" has been used above to denote an entity. The entity may be a company, corporation, university, non-profit organization etc. The entity may even be an individual. The entity may also be an organization that sponsors an individual (e.g., a company sponsoring an employee). The consolidated bill associated with the user/customer may be paid for by the entity. Here, the capabilities provided to the employee of a company may be restricted compared to an individual subscription.

In one or more embodiments, the wireless service control may provide for other interesting scenarios from a business perspective. In one example scenario, through a subscription from an organization, the wireless service control may be utilized as a tool to monitor employee attendance. A number of employees may be utilizing mobile phones provided through the organization. The location of an office associated with the organization may be a location at which wireless service control may be subscribed through the organization. Whenever an employee arrives to office for work, the wireless service control associated with the mobile phone thereof may be activated. Thus, by extracting a timestamp associated with the beginning and end of wireless service control (e.g., when the employee leaves the office) based on the identification data associated with the employee on a regular basis, employee attendance may be monitored. For example, the timestamp attached to the beginning and end of wireless service control may be transmitted to the user/customer (here, the organization) in the consolidated bill through which employee attendance may be monitored. Other implementations are within the scope of the exemplary embodiments.

In another example scenario, whenever subscribers of the mobile service and/or the wireless (mobile) service control fall within a covered (predefined) area/location, the service provider/another entity may opt to transmit advertisement SMS messages to the subscribers based on the detection thereof within the covered area. Here, the subscription to the wireless service control may/may not be required as the detection of mobile devices associated with the subscribers in the covered area may be performed through the equipment associated with the service provider. In yet another example scenario, again, an organization may have subscribed a number of employees thereof to the wireless service control. Thus, important meetings within/outside the organization may be protected with security and/or sensitivity provided through the wireless service control. The wireless service control may also be utilized to remind one or more members of the organization of an impending meeting. Thus, based on the time of the meeting for which wireless service control is requested, the control system of the mobile communication system may be configured to transmit an alert/reminder to the one or more members. The need for the one or more members to add the date and time to a work calendar and/or a human assistant to send a reminder thereto may be dispensed with.

Further, in another example scenario involving a hospital, emergencies may not necessitate communicating to doctors over a microphone. The hospital, which may have a subscription for the wireless service control for the doctors and/or the staff, may handle emergencies through text messaging (e.g., SMS) the appropriate doctor (and/or staff member). The hospital, which may have special control privileges from the service provider due to the importance thereof, may exercise the aforementioned privileges appropriately. For example, the appropriate doctor (and/or staff member) carrying a mobile device may be identified based on the location thereof detected through the one or more antennas (e.g., sequence of detection) discussed above and an alert may be transmitted thereto. Alternately, the appropriate doctor may be personally called for the emergency based on the detection of the mobile device associated therewith.

Still further, in an example scenario, the wireless service control may be utilized as a security token in an organization. The organization may have subscribed all of the employees thereof to the wireless service control. The office (e.g., doorway) associated with the organization may be a coverage area where personnel carrying mobile devices are identified following a verification thereof with the security system (e.g., associated with the service provider where subscription is required, owned by the organization where subscription is not required). Only after the verification can the personnel enter through the doorway.

In one or more embodiments, the static wireless service control (e.g., shown in FIG. 1) and the vehicular wireless service control (e.g., shown in FIG. 2) may be provided through the same service provider. Alternately, in one or more embodiments, the static wireless service control and the vehicular wireless service control may be provided through different service providers. In one or more embodiments, in the case of the vehicular wireless service control, the appropriate equipment (e.g., purchased from the service provider) described in FIG. 2 may be installed in the vehicle associated with the user/customer. In one or more embodiments, exemplary embodiments discussed herein may involve user/customer subscription(s) of service(s) provided through the service provider, and, therefore, issues such as tampering of equipment by the user/customer may be dealt with based on policies of the service provider and/or the service agreement between the service provider and the user/customer. The equipment associated with the wireless service control may be owned by the user/customer, but such a scenario may not fall under the purview of a user/customer subscription of the wireless service control.

Figure 15:
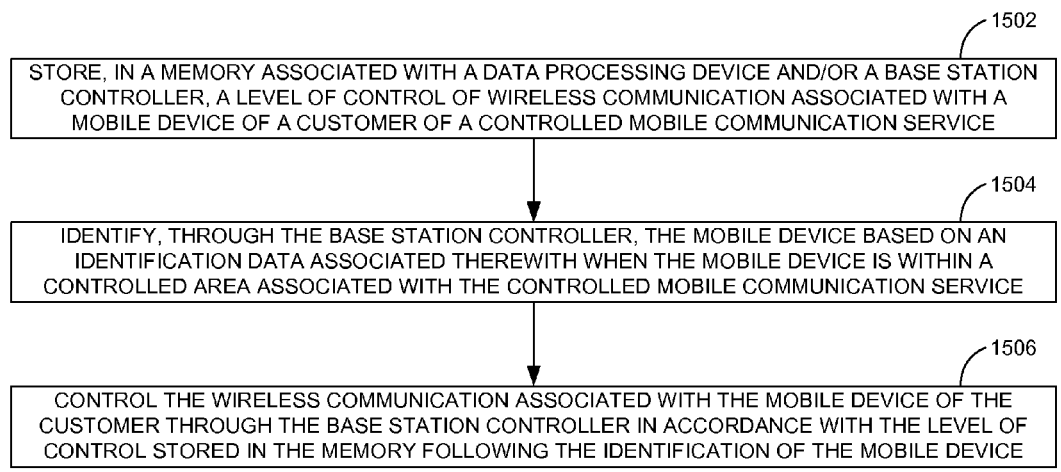
FIG. 15 is a process flow diagram detailing the operations involved in a method of providing controlled mobile communication as a service in the mobile communication systems of FIG. 1 and FIG. 2, according to one or more embodiments.

FIG. 15 shows a process flow diagram detailing the operations involved in a method of providing controlled mobile communication as a service in mobile communication system 100 and/or vehicular mobile communication system 200, according to one or more embodiments. In one or more embodiments, operation 1502 may include storing, in a memory (e.g., a database) associated a data processing device (e.g., billing server 1204, local server 1208) and/or a base station controller (e.g., the BSCs of FIGS. 1 and 2), a level of control of wireless communication associated with a mobile device (e.g., mobile devices of FIG. 1 and FIG. 2) of a customer of the controlled mobile communication as a service. In one or more embodiments, the wireless communication being provided through an MNO (e.g., MNOs of FIGS. 1 and 2).

In one or more embodiments, operation 1504 may involve identifying, through the base station controller, the mobile device based on an identification data (e.g., IMSI number, IMEI number) associated therewith when the mobile device is within a controlled area (see, the controlled and coverage area(s) of FIGS. 1 and 2) associated with the controlled mobile communication service. In one or more embodiments, operation 1506 may then involve controlling the wireless communication associated with the mobile device of the customer through the base station controller in accordance with the level of control stored in the memory following the identification of the mobile device.

Figure 16:
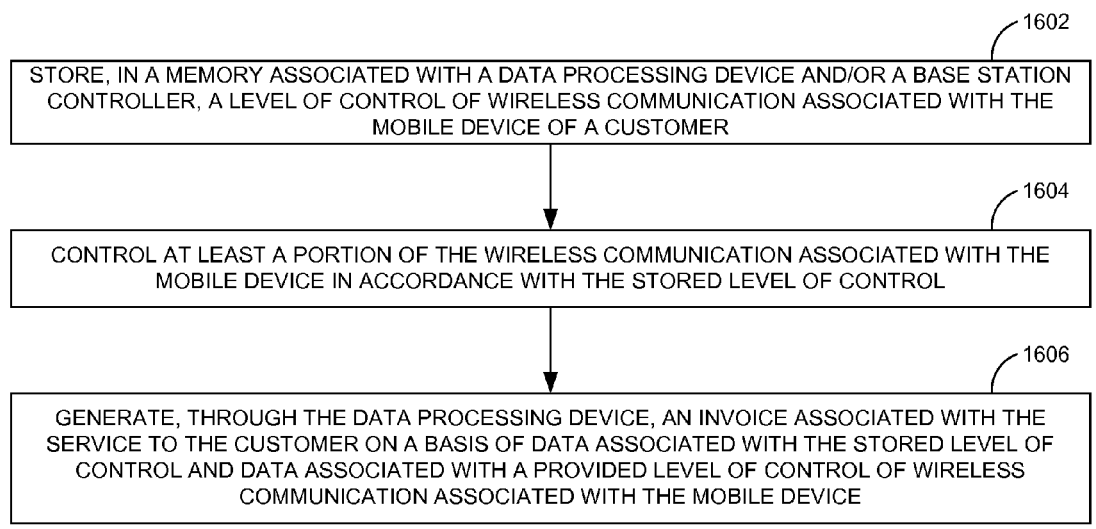
FIG. 16 shows a process flow diagram detailing the operations involved in a method of transacting a service involving control of wireless communication associated with a mobile device of a customer thereof, according to one or more embodiments.

FIG. 16 shows a process flow diagram detailing the operations involved in a method of transacting a service involving control of wireless communication associated with a mobile device (e.g., the mobile devices of FIGS. 1 and 2) of a customer thereof, according to one or more embodiments. In one or more embodiments, operation 1602 may involve storing, in a memory (e.g., a database) associated with a data processing device (e.g., billing server 1204, local server 1208) and/or a base station controller (e.g., the BSCs of FIG. 1 and FIG. 2), a level of control of wireless communication associated with the mobile device of the customer. In one or more embodiments, operation 1604 may involve controlling at least a portion of the wireless communication associated with the mobile device in accordance with the stored level of control. In one or more embodiments, operation 1606 may then involve generating, through the data processing device, an invoice associated with the service to the customer on a basis of data associated with the stored level of control and data associated with a provided level of control of wireless communication associated with the mobile device.

Although the present embodiments have been described with reference to specific example embodiments, it will be evident that various modifications may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., computer devices), and may be performed in any order (e.g., including means for achieving the various operations). Accordingly, the specification and the drawings are regarded in an illustrative rather than a restrictive sense.

What is claimed is:

1. A method of providing controlled mobile communication as a service comprising:

providing, to at least one of a user of a mobile device and an entity associated therewith, a capability to subscribe to control of wireless communication associated with the mobile device in at least one controlled area requiring social sensitivity on part of the user, the wireless communication being provided through a mobile network operator;

storing, in a memory associated with at least one of a data processing device and a base station controller, a level of control of the wireless communication associated with the mobile device in accordance with the subscription;

identifying, through the base station controller, the mobile device based on an identification data associated therewith when the mobile device is within the at least one controlled area;

controlling the wireless communication associated with the mobile device of the user through the base station controller in accordance with the level of control stored in the memory following the identification of the mobile device in the at least one controlled area through an antenna of a base station associated with the base station controller generating a signal that is stronger than a wireless signal of a cell site associated with the wireless communication service to the mobile device;

determining that the mobile device is within the at least one controlled area based on one of a sequence of detection of the mobile device through the antenna of the base station associated with the base station controller and another antenna when the mobile device passes an access control point to enter the at least one controlled area, the access control point being a point of entry into the at least one controlled area, and the at least one controlled area being associated with the antenna of the base station; and gaining, through the base station controller, control of an access of the wireless communication associated with the mobile device based on the identification data when the mobile device is within the at least one controlled area, the control being gained through the antenna of the base station generating the signal that is stronger than the wireless signal of the cell site associated with the wireless communication service to the mobile device, wherein when the mobile device is in a vehicle, the method further comprises:
determining that the mobile device is inside the at least one controlled area based on a detection thereof through the antenna associated with the base station of the base station controller, the base station being associated with the vehicle; and controlling the generation of the stronger signal by the antenna through a network listener base station associated with the vehicle.

2. The method of claim 1, wherein controlling the wireless communication includes one of permitting and denying at least some portion of the wireless communication associated with the mobile device through the base station controller based on the stored level of control.

3. The method of claim 1, wherein the level of control of the wireless communication associated with the mobile device of the user is tiered based on at least one of a number of parameters associated with the wireless communication to be controlled, a type of user, a time of control of the wireless communication, a date of control of the wireless communication, a duration of control of the wireless communication and a desired location of control of the wireless communication.

4. The method of claim 1, further comprising:
authenticating the user based on an identifier thereof, the identifier being one of the identification data and an identifier different from the identification data.

5. The method of claim 4, further comprising preventing controlling of the wireless communication associated with the mobile device upon a failure of the authentication of the user.

6. The method of claim 1, further comprising generating, through the data processing device, an invoice to the user based on the provided level of control of the wireless communication of the mobile device associated therewith.

7. The method of claim 3, wherein the parameters associated with the wireless communication to be controlled include phone calls, text messages, multimedia messages and service provider alerts.

8. The method of claim 6, further comprising:
retrieving data associated with a preferred level of control of wireless communication associated with the mobile device of the user; and
decreasing an amount from the invoice when data associated with the provided level of control of the wireless communication fails to conform with the preferred level of control of the wireless communication.

9. The method of claim 1, further comprising providing at least one of an Internet service, a landline phone service and the wireless communication service to the user, in addition to the control of wireless communication as a service.

10. The method of claim 1, further comprising providing, to the user, a capability to one of temporarily and permanently disable the control of the wireless communication associated with the mobile device thereof therethrough.

11. The method of claim 4, further comprising:
retrieving the stored level of control of the wireless communication associated with the user from the memory following the authentication.

12. The method of claim 1, wherein the identification data of the mobile device is one of an International Mobile Subscriber Identity (IMSI) number and an International Mobile Station Equipment Identity Number (IMEI) number.

13. The method of claim 1, wherein the control of the wireless communication associated with the mobile device is effected through the base station controller in conjunction with the mobile network operator associated with the wireless communication service to the mobile device.

14. A method of transacting a service involving control of wireless communication associated with a mobile device of a user comprising:
providing, to at least one of the user of the mobile device and an entity associated therewith, a capability to subscribe to the control of wireless communication associated with the mobile device in at least one controlled area requiring social sensitivity on part of the user, the wireless communication being provided through a mobile network operator;

storing, in a memory associated with at least one of a data processing device and a base station controller, a level of control of wireless communication associated with the mobile device of the user in accordance with the subscription;

controlling at least a portion of the wireless communication associated with the mobile device in accordance with the stored level of control in the at least one controlled area through an antenna of a base station associated with the base station controller generating a signal that is stronger than a wireless signal of a cell site associated with the wireless communication service to the mobile device;

generating, through the data processing device, an invoice associated with the service to the user on a basis of data associated with the stored level of control and data associated with a provided level of control of wireless communication associated with the mobile device;

determining that the mobile device is within the at least one controlled area based on one of a sequence of detection of the mobile device through the antenna of the base station associated with the base station controller and another antenna when the mobile device passes an access control point to enter the at least one controlled area, the access control point being a point of entry into the at least one controlled area, and the at least one controlled area being associated with the antenna of the base station; and gaining, through the base station controller, control of an access of the wireless communication associated with the mobile device based on an identification data thereof when the mobile device is within the at least one controlled area, the control being gained through the antenna of the base station generating the signal that is stronger than the wireless signal of the cell site associated with the wireless communication service to the mobile device, wherein when the mobile device is in a vehicle, the method further comprises:
determining that the mobile device is inside the at least one controlled area based on a detection thereof through the antenna associated with the base station of the base station controller, the base station being associated with the vehicle; and
controlling the generation of the stronger signal by the antenna through a network listener base station associated with the vehicle.

15. The method of claim 14, wherein controlling at least the portion of the wireless communication includes one of permitting and denying at least some portion of the wireless communication associated with the mobile device through the base station controller based on the stored level of control.

16. The method of claim 14, wherein the level of control of the wireless communication associated with the mobile device of the user is tiered based on at least one of a number of parameters associated with the wireless communication to be controlled, a type of user, a time of control of the wireless communication, a date of control of the wireless communication, a duration of control of the wireless communication and a desired location of control of the wireless communication.

17. The method of claim 14, further comprising:
authenticating the user based on an identifier thereof, the identifier being one of the identification data and an identifier different from the identification data.

18. The method of claim 17, further comprising preventing controlling of the wireless communication associated with the mobile device upon a failure of the authentication of the user.

19. The method of claim 16, wherein the parameters associated with the wireless communication to be controlled include phone calls, text messages, multimedia messages and service provider alerts.

20. The method of claim 14, further comprising:
decreasing an amount from the invoice when the data associated with the provided level of control of the wireless communication fails to conform with the stored level of control of the wireless communication.

21. The method of claim 14, further comprising providing at least one of an Internet service, a landline phone service and the wireless communication service to the user, in addition to the service involving control of wireless communication associated with the mobile device.

22. The method of claim 14, further comprising providing, to the user, a capability to one of temporarily and permanently disable the control of the wireless communication associated with the mobile device thereof therethrough.

23. The method of claim 17, further comprising:
retrieving the stored level of control of the wireless communication associated with the user from the memory following the authentication.

24. The method of claim 14, wherein the identification data of the mobile device is one of an IMSI number and an IMEI number.

25. The method of claim 14, wherein the control of the wireless communication associated with the mobile device is effected through the base station controller in conjunction with a mobile network operator associated with the wireless communication service to the mobile device.

26. A mobile communication system providing controlled wireless communication as a service comprising:
a mobile device associated with a customer of the controlled wireless communication as a service;
a data processing device configured to provide the customer a capability to subscribe to the control of wireless communication associated with the mobile device in at least one controlled area requiring social sensitivity on part of the customer, and to store a level of control of wireless communication associated with the mobile device in a memory associated therewith in accordance with the subscription;
a base station having an antenna associated therewith; and
a base station controller of the base station to identify the mobile device based on an identification data associated therewith when the mobile device is within the at least one controlled area and to control at least a portion of the wireless communication associated with the mobile device in accordance with the level of control stored in the memory associated with the data processing device following the identification through the antenna of the base station generating a signal that is stronger than a wireless signal of a cell site associated with the wireless communication service to the mobile device, the base station controller being configured to determine that the mobile device is within the at least one controlled area based on one of a sequence of detection of the mobile device through the antenna of the base station and another antenna when the mobile device passes an access control point to enter the at least one controlled area, the access control point being a point of entry into the at least one controlled area, and the at least one controlled area being associated with the antenna of the base station,
wherein when the mobile device is in a vehicle, the base station controller is configured to:
determine that the mobile device is inside the at least one controlled area based on a detection thereof through the antenna associated with the base station, the base station here being associated with the vehicle; and
control the generation of the stronger signal by the antenna through a network listener base station associated with the vehicle,
wherein the data processing device is further configured to generate an invoice associated with the service to the customer on a basis of data associated with the stored level of control and data associated with a provided level of control of wireless communication associated with the mobile device.

27. The system of claim 26, wherein the base station controller is configured to control at least the portion of the wireless communication through one of permitting and denying at least some portion of the wireless communication associated with the mobile device based on the stored level of control.

28. The system of claim 26, wherein the level of control of the wireless communication associated with the mobile device of the customer is tiered based on at least one of a number of parameters associated with the wireless communication to be controlled, a type of customer, a time of control of the wireless communication, a date of control of the wireless communication, a duration of control of the wireless communication and a desired location of control of the wireless communication.

29. The system of claim 27, wherein the parameters associated with the wireless communication to be controlled include phone calls, text messages, multimedia messages and service provider alerts.

30. The system of claim 26, wherein the data processing device is further configured to decrease an amount from the invoice when the data associated with the provided level of control of the wireless communication fails to conform with the stored level of control of the wireless communication.

31. The system of claim 26, wherein the base station controller is configured to provide, to the customer, a capability to one of temporarily and permanently disable the control of the wireless communication associated with the mobile device thereof therethrough.

32. The system of claim 26, wherein the identification data of the mobile device is one of an IMSI number and an IMEI number.

33. The system of claim 26, wherein the base station controller is configured to effect the control of the wireless communication associated with the mobile device in conjunction with a mobile network operator associated with the wireless communication service to the mobile device.

* * * * *